United States Patent
Wilber et al.

(10) Patent No.: US 8,073,631 B2
(45) Date of Patent: Dec. 6, 2011

(54) DEVICE AND METHOD FOR RESPONDING TO INFLUENCES OF MIND

(75) Inventors: Scott A. Wilber, Roswell, NM (US); Patrick A. Wilber, Houston, TX (US); Christopher B. Jensen, Houston, TX (US)

(73) Assignee: Psigenics Corporation, Gainesville, FL (US)

( * ) Notice: Subject to any disclaimer, the term of this patent is extended or adjusted under 35 U.S.C. 154(b) by 460 days.

(21) Appl. No.: 11/989,078

(22) PCT Filed: Jul. 21, 2006

(86) PCT No.: PCT/US2006/028359
§ 371 (c)(1), (2), (4) Date: Jan. 18, 2008

(87) PCT Pub. No.: WO2007/014031
PCT Pub. Date: Feb. 1, 2007

(65) Prior Publication Data
US 2009/0265112 A1 Oct. 22, 2009

Related U.S. Application Data

(60) Provisional application No. 60/701,928, filed on Jul. 22, 2005, provisional application No. 60/792,080, filed on Apr. 14, 2006.

(51) Int. Cl.
*G06F 19/00* (2011.01)

(52) U.S. Cl. .......... 702/19; 702/186; 708/250; 708/255; 331/78; 706/22

(58) Field of Classification Search ............ 702/19, 702/186; 708/250, 251, 253, 255; 341/131; 331/46, 47, 78
See application file for complete search history.

(56) References Cited

U.S. PATENT DOCUMENTS

| | | | | |
|---|---|---|---|---|
| 4,075,622 A * | 2/1978 | Lawrence et al. | | 341/67 |
| 4,853,884 A * | 8/1989 | Brown et al. | | 708/3 |
| 5,239,494 A * | 8/1993 | Golbeck | | 708/3 |
| 5,830,064 A * | 11/1998 | Bradish et al. | | 463/22 |
| 6,061,702 A * | 5/2000 | Hoffman | | 708/251 |
| 6,324,558 B1 * | 11/2001 | Wilber | | 708/255 |

(Continued)

OTHER PUBLICATIONS

Thouless, "The Repeated Guessing Technique", International Journal of Parapsychology, 1960, pp. 21-36, vol. 2, No. 3.

(Continued)

*Primary Examiner* — Carol Tsai
(74) *Attorney, Agent, or Firm* — Thomas Swenson

(57) ABSTRACT

In the field of direct mind-machine interactions, prior art devices and methods do not provide sufficiently fast and reliable results. Mental influence detectors (100, 140, 400, 430) and corresponding methods provide fast and reliable results useful for detecting an influence of mind and hidden or classically non-inferable information. An anomalous effect detector (100) includes a source (104) of non-deterministic random numbers (110), a converter (114) to convert a property of numbers, a processor to accept converter output (118) and to produce an output signal (124) representative of an influence of mind. The processor output signal (124) contains fewer numbers than the input (110). A quantum computer (400) includes a physical source of entropy (404) to generate output numbers (405); a source (406) of test numbers (407); a measurement processor 410) to accept output numbers (405) and to measure a relationship between process numbers and at least one test number to produce an output (414) representative of an influence of mind.

31 Claims, 12 Drawing Sheets

U.S. PATENT DOCUMENTS

| | | | | |
|---|---|---|---|---|
| 6,369,727 | B1* | 4/2002 | Vincze | 341/131 |
| 6,374,278 | B1* | 4/2002 | Korn et al. | 708/250 |
| 6,581,078 | B1* | 6/2003 | Liardet | 708/250 |
| 6,862,605 | B2* | 3/2005 | Wilber | 708/255 |
| 6,954,770 | B1* | 10/2005 | Carlson et al. | 708/251 |
| 7,096,242 | B2* | 8/2006 | Wilber | 708/255 |
| 7,216,038 | B2* | 5/2007 | Vitaliano et al. | 702/19 |
| 7,587,439 | B1* | 9/2009 | Onufryk et al. | 708/250 |
| 2002/0035586 | A1* | 3/2002 | Szajnowski | 708/250 |
| 2002/0169810 | A1* | 11/2002 | Wilber | 708/250 |
| 2003/0037079 | A1* | 2/2003 | Wilber | 708/250 |
| 2004/0076293 | A1* | 4/2004 | Smeets et al. | 380/46 |
| 2004/0107229 | A1* | 6/2004 | Remi | 708/250 |
| 2004/0205095 | A1* | 10/2004 | Gressel et al. | 708/253 |
| 2006/0010182 | A1* | 1/2006 | Altepeter et al. | 708/250 |
| 2007/0033242 | A1* | 2/2007 | Wilber | 708/250 |
| 2007/0162809 | A1* | 7/2007 | de Jager et al. | 714/746 |
| 2007/0282934 | A1* | 12/2007 | Luzzi et al. | 708/250 |
| 2008/0183314 | A1 | 7/2008 | Klouzal et al. | |

OTHER PUBLICATIONS

Scott, "An Appendix to the Repeated Guesing Technique", International Journal of Parapsychology, 1960, pp. 37-45, vol. 2, No. 3.

Taetzch, "A Design of a Psi Communications System", International Journal of Parapsychology, 1962, pp. 35-66, vol. 4.

Jahn et al., "Mind/Machine Interaction Consortium: PortREG Replication Experiments", Journal of Scientific Exploration, 2000, pp. 499-555, vol. 14, No. 4.

Ibison, "Evidence that Anomalous Statistical Influence Depends on the Details of the Random Process", Journal of Scientific Exploration, 1998, pp. 407-423, vol. 12, No. 3.

Dobyns, "Overviw of Several Theoretical Models on PEAR Data", Journal of Scientific Exploration, 2000, pp. 163-194, vol. 14, No. 2.

Radin, "Enhancing Effects in Psi Experiments with Sequential Analysis: A Replication and Extension", European Journal of Parapsychology, 1990-91, vol. 8, pp. 98-111.

Puthoff et al., "Calculator-Assisted Psi-Amplification II", in Research in Psychology, D. Weiner et al., eds., Scarecrow Press, Metuchen, NJ, 1985, pp. 73-77.

Ryzl, "A Model of Parapsychological Communication", The Journal of Parapsychology, 1966, pp. 18-30, 30(1).

Kennedy, "Methods for Investigating Goal-Oriented PSI", The Journal of Parapsychology, 1995, pp. 47-62, vol. 59.

Carpenter, "Prediction of Forced-Choice ESP Performance", The Journal of Parapsychology, 1983, pp. 217-236, vol. 47.

Carpenter, "Prediction of Forced-Choice ESP Performance", The Journal of Parapsychology, 1991, pp. 227-280, vol. 55.

Brier et al., "PSI Application: Part I. A Preliminary Attempt", The Journal of Parapsychology, 1970, pp. 1-25, vol. 34, No. 1.

Brier et al., "PSI Application: Part II. The Majority Vote Technique—Analysis and Observations", The Journal of Parapsychology, 1970, pp. 26-36, vol. 34, No. 1.

Khrennivov, "Classical and Quantum Mechanics on Information Spaces with Applications to Cognitive, . . . Phenomena", Foundations of Physics, 1999, pp. 1065-1098, vol. 29, No. 7.

UTTS, "An Assessment of the Evidence for Psychic Functioning", 1995, 22 pages, University of California, Davis, Division of Statistics.

UTTS, "Replication and Meta-Analysis in Parapsychology", Statistical Science, 1991, pp. 363-378, vol. 6, No. 4.

Storm, "A Paradigm Shift Away from the ESP-pk Dichotomy: The Theory of Psychopraxia", The Journal of Parapsychology, 2000, pp. 279-297, vol. 64.

Atmanspacher et al., "Problems of Reproducibility in Complex Mind-Matter Systems", Journal of Scientific Exploration, 2003, pp. 243-270, vol. 17.

Atmanspacher et al., "Deviations from Physical Randomness Due to Human Agent Intention?", Chaos, Solitons, & Fractals, 1999, pp. 935-952, vol. 10.

Atmanspacher et al., "Investigating Deviations from Dynamical Randomness with Scaling Indices", Journal of Scientific Exploration, 2000, pp. 1-18, vol. 14, No. 1.

Radin et al., Evidence for Consciousness-Related Anomalies in Random Physical Systems, Foundations of Physics, 1989, pp. 1499-1514, vol. 19, Nol 12.

Radin, "Neural Network Analysis of Consciousness-Related Patterns in Random Sequences", Society for Scientific Exploration, 1993, pp. 355-373.

Jahn, "The Persistent Paradox of Psychic Phenomena: An Engineering Perspective", Proceedings of the IEEE, 1982, pp. 136-170, vol. 70, No. 2.

Radin, "Searching for 'Signatures' in Anomalous Human-Machine Interaction Data: A Neural Network Approach", J. of Scientific Exploration, 1989, pp. 185-200, vol. 3, No. 2.

Radin, Dean I et al., Towards a High Technology of the Mind: Rationale, Prototype Design and Initial Experiments, Mar. 13, 1991, Contel Technology Center, Chantilly, VA.

Steele, J.M., Random Walk and First Step Analysis, in Stochastic Calculus and Financial Applications, Karatzas, I. and Yor, M., editors, 2001, pp, 1-9, Springer-Verlag, New York, NY.

* cited by examiner

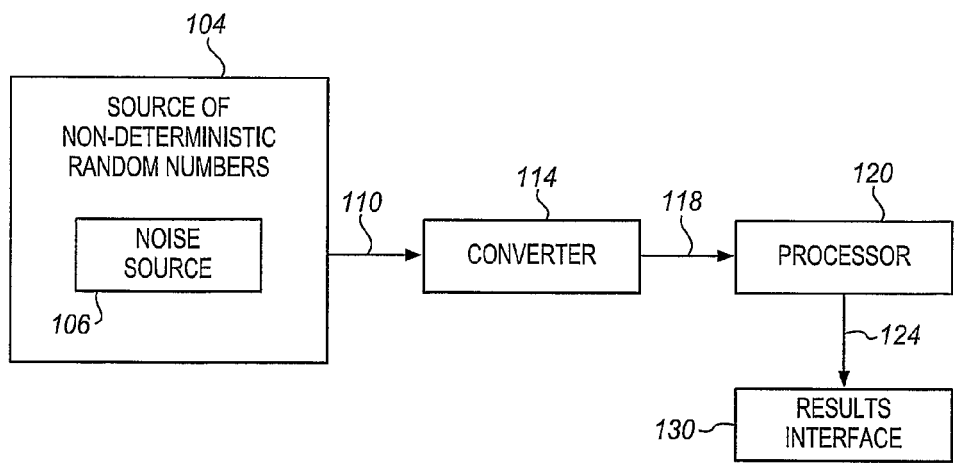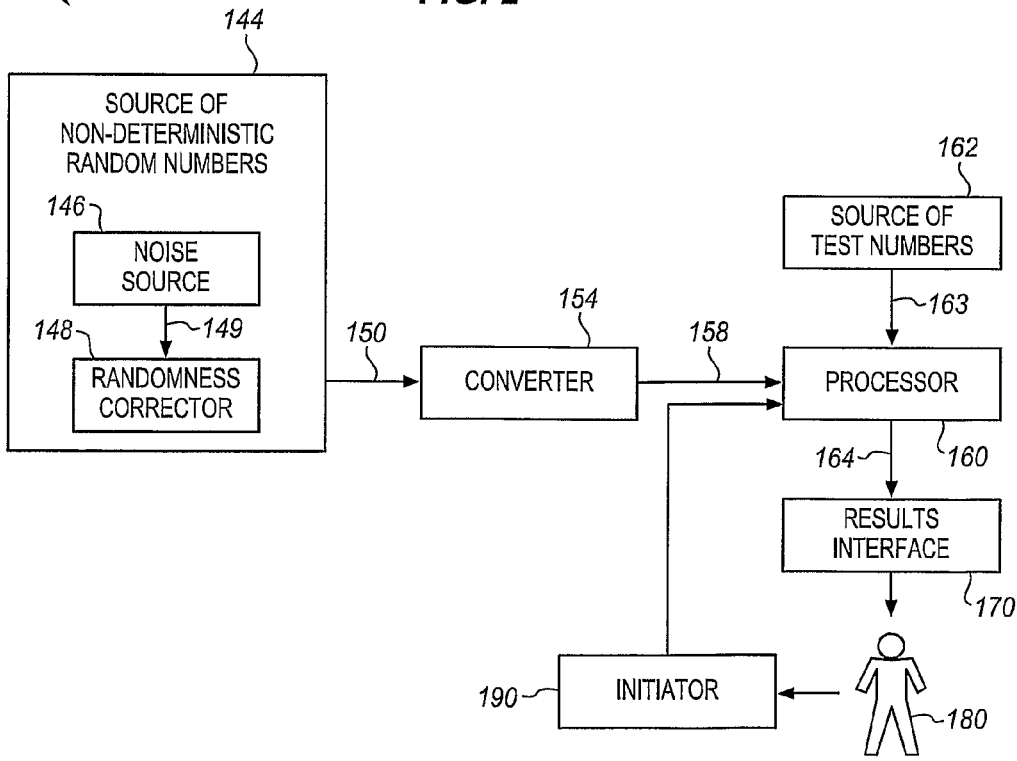

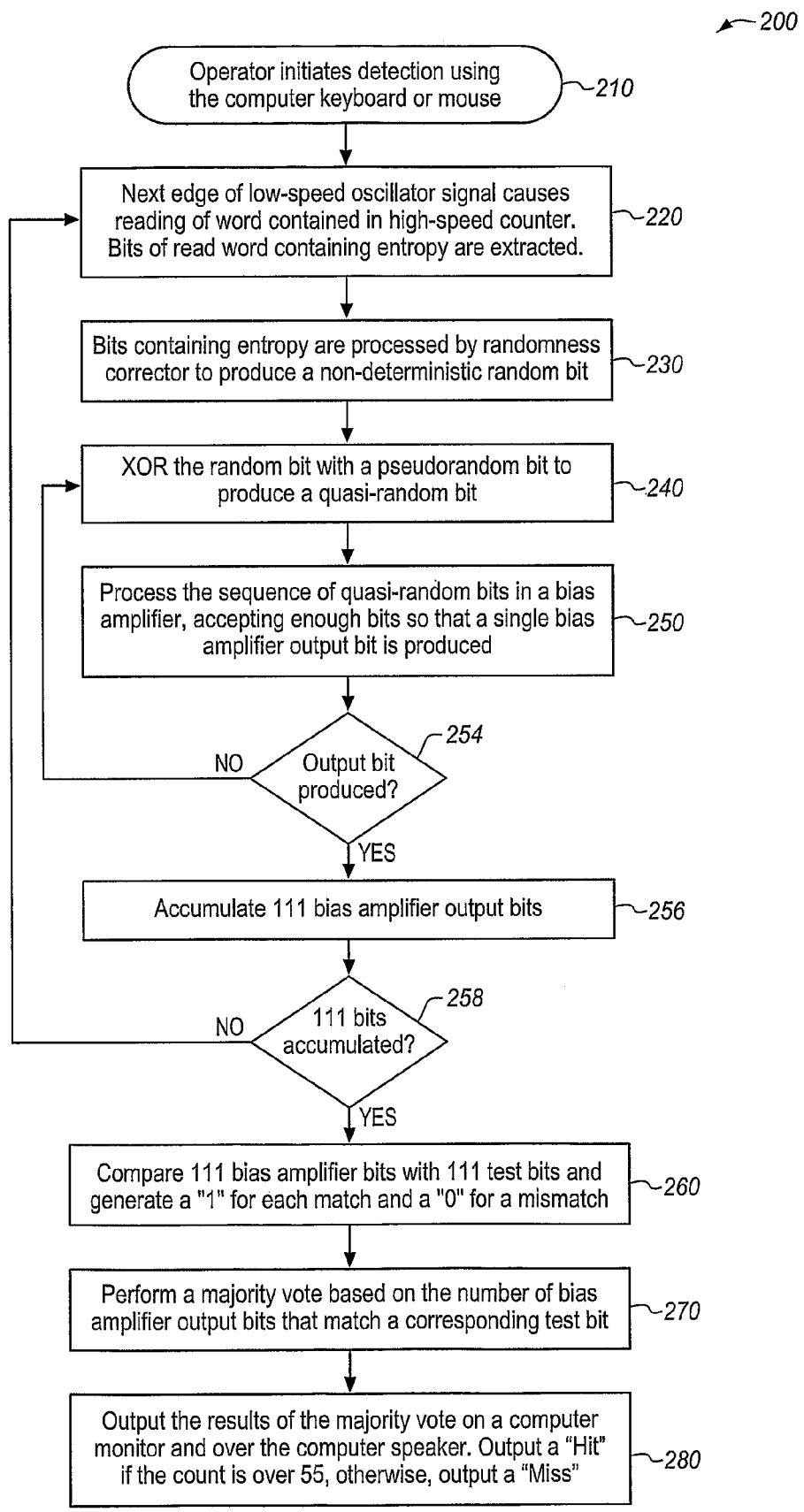

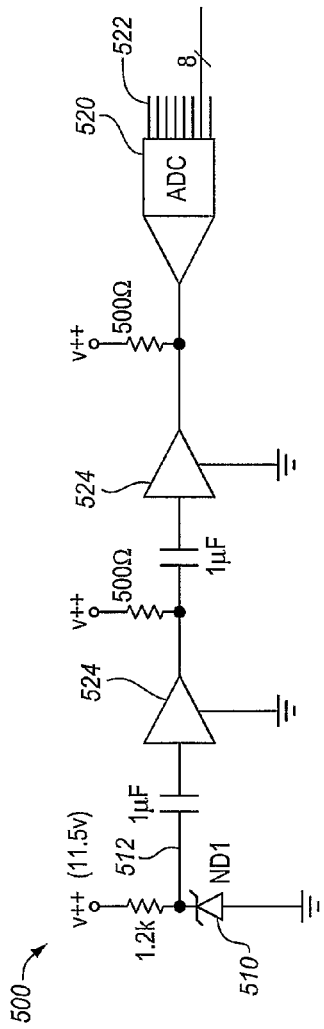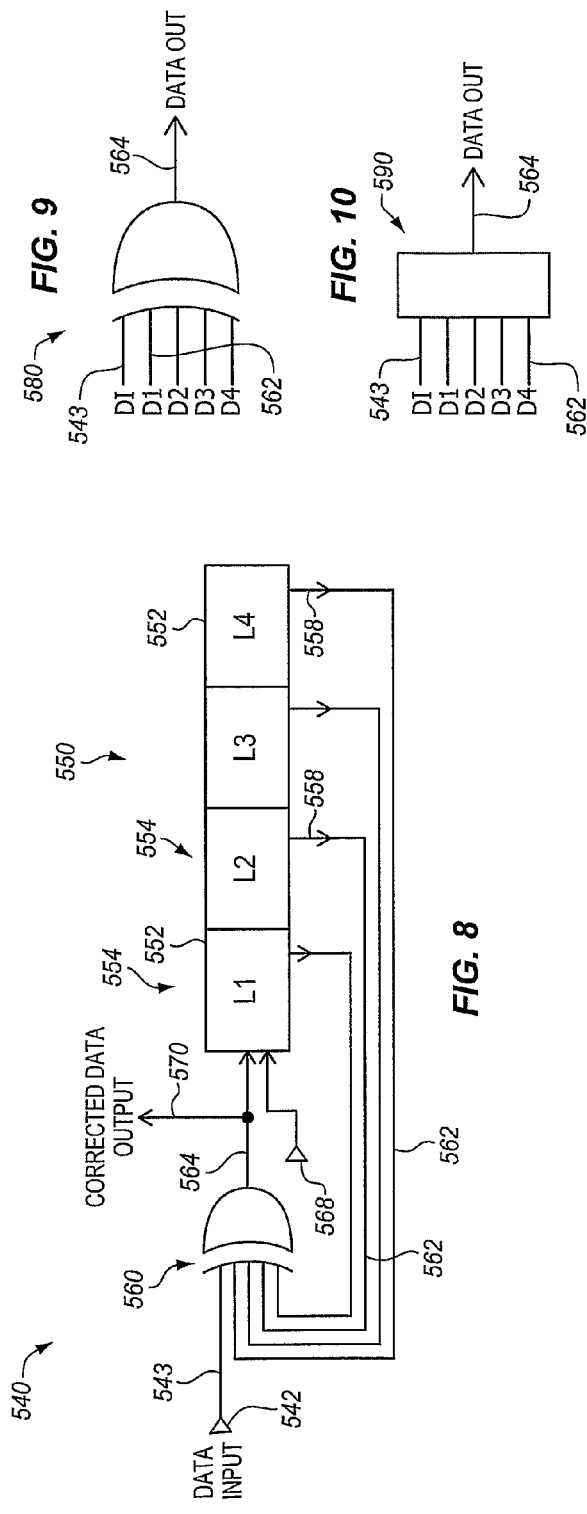

TO PROCESSOR

DEVICE AND METHOD FOR RESPONDING TO INFLUENCES OF MIND

CROSS-REFERENCE TO RELATED APPLICATIONS

The present application is a 371 of PCT/US2006/028359 Jul. 21, 2006 which claims benefit of 60/701,928 Jul. 22, 2005 and claims benefit of 60/792,080 Apr. 14, 2006.

TECHNICAL FIELD

The present invention relates to the field of information detection and transfer, and more specifically to a device and method for responding to influences of mind.

BACKGROUND ART

Devices for detecting direct mind-machine interaction (DMMI) have been proposed and researched for many years. The most carefully controlled and best-explored experiments utilize some type of true, or non-deterministic, random number generator (TRNG) that produces a sequence of random numbers, usually in a binary form. The most common random number generators used are of the electronic type that produce a sequence of random binary bits, or events. This has been referred to as a random event generator (REG).

U.S. Pat. No. 6,369,727, issued Apr. 9, 2002, to Vincze, teaches a random number generator using an analog-to-digital converter to convert random noise into digital samples that are transformed by a reductive mapping into uniformly distributed random numbers for output. U.S. Pat. No. 6,581,078, issued Jun. 17, 2003, to Liardet, teaches a random number generator in which a physical voice source produces digital signals that are combined with signals produced by a pseudo-random number generator. U.S. Pat. No. 4,853,884, issued Aug. 1, 1989, to Brown et al, teaches a random number generator in which a zener diode produces a random binary number output having a controlled degree of randomness determined in response to an input control signal.

In typical DMMI experiments, an REG is operated in conjunction with a human operator who attempts to influence the statistical properties of the REG's output sequence. The operator, or subject, is directed to intend mentally the number of ones produced in the random sequence to be either higher, lower, or equal to the statistically expected number.

The results of these experiments, compiled over thousands of experimental trials, show a small but persistent and statistically significant effect. A most notable example of a research program for detecting DMMI is the long-standing program at Princeton University, known as Princeton Engineering Anomalies Research (PEAR). This work is described in detail in the book *Margins of Reality, the Role of Mind in the Physical World*, by Robert Jahn and Brenda Dunne, Harcourt Brace and Company, 1987.

The PEAR lab and numerous other facilities around the world have established, to a very high level of statistical significance, the existence of a link between the mental intention of an operator and results of measurements of REG output. Demonstrating the reality of DMMI is of great scientific interest. However, the laboratory demonstration has not translated into useful devices or methods. Practical applications of DMMI have not previously been achieved due to an absence of understanding of why or how the effect manifests, and because the experimental devices and data processing methods used are not sensitive enough to the effect.

Journal articles by many authors have suggested a variety of potential uses of DMMI. These suggestions are made without disclosing means for their implementation. Apparatuses for experiments involving DMMI have been complex and expensive. U.S. Pat. No. 5,830,064, issued Nov. 3, 1998, to Bradish et al, teaches a method and apparatus of generating values and detecting whether the values fall outside chance expectations. This patent involves converting some of the values according to a selection pattern in order to measure a collective statistical variance.

There are, in fact, no practical devices currently on the market that utilize DMMI. This is because all previous devices and methods have required intense and extended effort to produce even a single correct bit of information.

DISCLOSURE OF INVENTION

The invention alleviates some of the limitations mentioned above by providing devices, systems and methods for detecting and responding to an influence of mind by generating data that is correlated with intended or desired information, including hidden or non-inferable information, at high rates of speed and high accuracy.

A first basic embodiment of a mental influence detector in accordance with the invention for responding to an influence of mind comprises an anomalous effect detector. A basic embodiment of an anomalous effect detector comprises: a source of non-deterministic random numbers; a converter operable to accept an input of non-deterministic random numbers from the source and to convert a property of the non-deterministic random numbers into a converter output; a processor for accepting the converter output and producing a processor output signal representative of the influence of mind; wherein the processor output signal contains fewer numbers than the input of non-deterministic random numbers; and an interface that is operable to communicate results from the processor.

A basic embodiment of a method of detecting an anomalous effect resulting from an influence of mind comprises: providing an input of non-deterministic random numbers; converting a property of the input of non-deterministic random numbers into a converter output; accepting the converter output into a processor; and producing in the processor a processor output signal representative of the influence of mind, wherein the processor output signal contains fewer numbers than the input of non-deterministic random numbers; and communicating results from the processor using an interface. Other embodiments of methods in accordance with the invention are clear from the descriptions herein. For example, some embodiments of a method of detecting an anomalous effect further comprise: providing at least one test number to the processor; measuring a relationship between the converter output in the processor and at least one test number to produce a relationship measurement; and in the processor, abstracting the relationship measurement to provide an enhanced output signal representative of the influence of mind. Abstracting comprises reducing the number of numbers.

A second basic embodiment of a mental influence detector in accordance with the invention for responding to an influence of mind comprises a quantum computer. A basic embodiment of a quantum computer for responding to an influence of mind, comprises: a physical source of entropy operable to generate output numbers; a source of test numbers; a measurement processor, the processor being operable to accept the output numbers, and being further operable to measure a relationship between process numbers in the processor and at least one test number to produce an output representative of the influence of mind, wherein the measurement processor comprises a relationship processor that is operable to measure a relationship between process numbers in measurement processor and at least one test number; and an interface that is operable to communicate results from the processor. A physical source of entropy in accordance with the invention embodies quantum mechanical properties of superposition and entanglement.

A basic embodiment of a method of using a quantum computer that is responsive to an influence of mind comprises: generating output numbers using a physical source of entropy; providing at least one test number; accepting the output numbers in a measurement processor; measuring a relationship between process numbers in the measurement processor and at least one test number to produce an output representative of an influence of mind; and communicating results from the measurement processor using an interface.

Accordingly, objects and advantages of the present invention are: to provide mental influence detectors and methods of detecting a mental influence to obtain useful information in an acceptable time period; to provide a mental influence detector device that is readily available at a low cost by making it accessible to individual users via the internet and by utilizing components available in the standard configuration of most personal computers; to provide a mental influence detector device that is hundreds of times more sensitive than previous devices; to bring embodiments of mental influence detectors and methods of using them into practical and common usage through greatly increased speed and reliability. Further objects and advantages are to provide mental influence detectors and methods that are widely available for experimentation and demonstration of influences of mind, thereby enhancing understanding and accelerating development of this valuable and untapped technology.

Other features, characteristics and advantages of embodiments in accordance with the invention will become apparent from consideration of the description and drawings below.

BRIEF DESCRIPTION OF DRAWINGS

A more complete understanding of the invention may be obtained by reference to the drawings, in which:

FIG. 1 contains a block diagram representing a general embodiment of an anomalous effect detector in accordance with the invention;

FIG. 2 contains a block diagram representing a preferred general embodiment of an anomalous effect detector in accordance with the invention;

FIG. 3 contains a process flow sheet of an exemplary method of operation of an anomalous effect detector in accordance with the invention;

FIG. 7 contains a block diagram illustrating a general embodiment of a multi-stream random number generator (RNG) in accordance with the present invention;

FIG. 8 contains a block diagram of a self-seeding randomness corrector suitable for use with a random number generator in accordance with the invention;

FIG. 9 depicts schematically an XOR gate suitable for use in accordance with the invention;

FIG. 10 depicts schematically a parity generator suitable for use in accordance with the invention;

MODES FOR CARRYING OUT THE INVENTION

Figure 4:
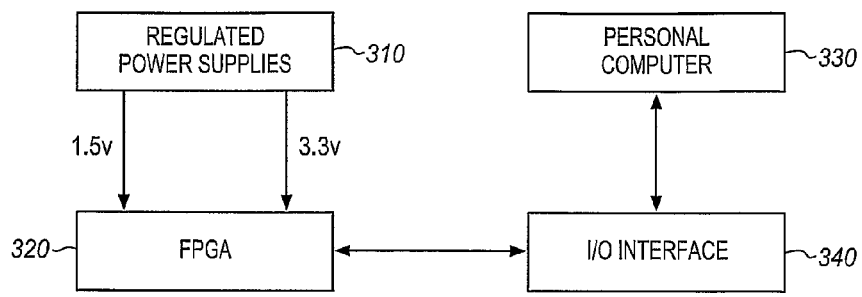
FIG. 4 depicts a block diagram of a system that comprises an anomalous effect detector in accordance with the invention and that is operable to practice a method in accordance with the invention of detecting an influence of mind.

The invention is described herein with reference to FIGS. 1-24. It should be understood that FIGS. 1-18, 20-24, depicting elements, systems and processes of embodiments in accordance with the invention, are not meant to be actual views or diagrams of any particular portion of an actual equipment component, apparatus or process. The figures instead show idealized representations that are employed to explain more clearly and fully the structures, systems and methods of the invention than would otherwise be possible.

Also, the figures represent only one of innumerable variations of structures and systems that could be made or adapted to use a method of the invention. Devices and methods are described with numerous specific details, such as components, oscillator frequencies and mathematical techniques, in order to provide a thorough understanding of the present invention. It will be obvious to one skilled in the art that these specific details are not required to practice the present invention. It is clear that embodiments in accordance with the invention can be practiced using structures, devices and processes very different from those of FIGS. 1-18, 20-24. The preferred embodiments described herein are exemplary and are not intended to limit the scope of the invention, which is defined in the claims below.

For the sake of clarity, in some of the figures below, the same reference numeral is used to designate structures and components that are the same or are similar in the various embodiments described.

The terms "non-deterministic", "non-deterministic bits", "true random number", "true random bits" and related terms are used in this specification interchangeably to designate a quality of true randomness of a number or bit of information, which means that the number or bit cannot be calculated or determined with certainty in advance. Non-deterministic random numbers can be thought to be arbitrary, unknowable, and unpredictable. For the sake of brevity, the abbreviated terms "random number" and "random numbers" are sometimes used in this specification synonymously with the terms denoting non-deterministic numbers, such as "non-deterministic random number" and "true random numbers". In this specification, the term "entropy" generally refers to a measure of the disorder or randomness of a system or object bearing information. A sequence of true random bits uninfluenced by mind has an entropy approaching 1.0 bit of entropy per bit. Embodiments in accordance with the invention are described herein usually with reference to digital numbers, for example, binary bits. It is understood, however, that some embodiments in accordance with the invention also include the generation and processing of analog numbers instead of or in addition to the generation and processing of digital numbers. The singular and plural forms of the word "number" are used broadly and sometimes used interchangeably in this specification. For example, the term "non-deterministic random numbers" may indicate an analog signal in some embodiments, as well as a sequence or subsequence of binary bits or other digital numbers in other embodiments.

The term "pseudorandom" and related terms in this specification means deterministic or algorithmically generated. It is known that some numbers are able to pass some or all known mathematical tests for randomness, but still be deterministic, that is, calculable or knowable in advance.

The term "quasi-random" and related terms in this specification refers to a number that includes both true random (i.e., non-deterministic) components and algorithmically generated (i.e., deterministic) components.

The term "mind" in this specification is used in a broad sense. The term "mind" includes a commonly accepted meaning of human consciousness that originates in the brain and is manifested especially in thought, perception, emotion, will, memory, and imagination. The term "mind" further includes the collective conscious and unconscious processes in a sentient organism that direct and influence mental and physical behavior. Embodiments in accordance with the invention are described herein usually with reference to a human operator and a human mind. It is understood, however, that embodiments in accordance with the invention are also operable to respond to an influence of the minds of other sentient organisms in addition to humans. Also, embodiments in accordance with the invention are described herein usually with reference to a conscious human mind in a state of awareness. It is understood, however, that embodiments in accordance with the invention are operable to respond to an influence of a mind not in a state of conscious awareness. Although the mind of a sentient organism generally is associated with functions of the brain, the term "mind" in this specification is not necessarily limited to functions of the brain, nor is the term "mind" in this specification necessarily related to functions of the brain.

The term "anomalous effect" and related terms in this specification include influences of mind that are not mediated by classical energies or forces. In one sense, the terms refer to the effects of mind on number sources and on physically measurable properties. Traditionally, concepts associated with anomalous effects have been used to explain such phenomena as ESP, Psi, Psychic Phenomena, Remote Viewing, Telepathy, Clairvoyance, Clairaudience, Psychokinesis, Precognition, Mental Powers, among others.

The terms "quantum mechanics", "quantum mechanical" and related terms in this specification refer to a fundamental branch of theoretical physics that complements Newtonian mechanics and classical electromagnetism, and often replaces Newtonian mechanics and classical electromagnetism at the atomic and subatomic levels. Quantum mechanics is the underlying framework of many fields of physics and chemistry, including condensed matter physics, quantum chemistry, and particle physics along with general relativity. It is one of the pillars of modern physics. Quantum mechanics is a more fundamental theory than Newtonian mechanics and classical electromagnetism, in the sense that it provides accurate and precise descriptions for many phenomena "classical" theories simply cannot explain.

The terms "quantum superposition", superposition and related terms in this specification refer to a phenomenon of quantum mechanics that occurs when an object simultaneously "possesses" two or more values (or states) of an observable quantity. It is postulated that when the observable quantity is measured, the values will randomly collapse to one of the superposed values according to a quantum probability formula. The concept of choice (e.g., free will) in a sentient being presupposes the superposition of possibilities.

The terms "quantum entanglement", entanglement and related terms in this specification refer to a quantum mechanical phenomenon in which the quantum states of two or more objects (including photons and other forms of energy) have to be described with reference to each other, even though the individual objects may be spatially separated. Quantum entanglement is the basis for emerging technologies, such as quantum computing. Entanglement can be across time or space.

The term "quantum computer" generally refers to any device for computation that makes direct use of distinctively quantum mechanical phenomena, such as superposition and entanglement, to perform operations on data. In this specification, the term "quantum computer" and related terms refer to a device that is operable to respond to an influence of the mind of a sentient organism (usually a human operator) on quantum mechanical wavefunctions. In this specification, the terms "bit", "bits" and related terms are used broadly to include both classical (or conventional) bits of information and quantum mechanical bits, or qubits.

A qubit is a basic unit of quantum information contained within a physical entity that embodies a superposition of two states. A measurement of the qubit's state collapses the superposition randomly to a determined bit with a value of 1 or 0.

Certain influences can cause the probability of the collapsed bit being 1, to be different than 50%. This includes an influence of mind.

An influence of mind can also produce an implicit entanglement between the wavefunction of a qubit and a test number or non-inferable information. Such an influence of mind increases the probability that the measured state of the qubit will be related to a test number or non-inferable information.

Non-inferable information is information that is either hidden or cannot be inferred from presently available information.

A plurality of qubits can be entangled to produce an exponentially increased number of superposed states. All the qubits and their superposed states are collectively subject to an influence of mind so that when a measurement is made, there is an enhanced probability that the measured state of the qubits is related to a test number or non-inferable information.

A plurality of qubits can be implicitly entangled with each other and with one or more test numbers or non-inferable information. The resultant measurements of these qubits' states can be processed by various converters such as a cross-correlation converter followed by a bias amplifier, and combined to greatly enhance the probability of a correct relationship in the processed output to the test numbers or non-inferable information.

Implicit entanglement greatly simplifies the construction of the assembly of qubits. Usually, the requirement of quantum coherence between the qubits is met by extremely rigorous control of physical structure and environment of the quantum circuit that embodies the qubits. Implicit entanglement caused by an influence of mind can partially entangle physical sources of entropy, which only contain a component of quantum mechanical superposition. The entanglement can span both distance and temporal displacement, and exist under conditions that would normally destroy any useful quantum coherence.

A programming input can be used to alter the wavefunction of one or more qubits. The signal supplied to the programming input can be derived from the measured states of other qubits or from a conditional processed signal. A conditional, or non-final, signal is produced from a previous one or more measurements and processing. This provides a means of enhancing both the accuracy and speed of providing a final processed output representative of an influence of mind.

The term "general computer" in this specification is used broadly to refer to a conventional computer, which typically has an input device (e.g., a keyboard), a central processing unit (CPU), memory, and a results interface (e.g., screen, printer). Examples include conventional desktop, laptop and some handheld devices.

FIG. 1 contains a block diagram representing a general embodiment of an anomalous effect detector 100 in accordance with the invention. Anomalous effect detector 100 includes a source of non-deterministic random numbers 104. An exemplary source of non-deterministic random numbers comprises an independent oscillator random number generator (RNG). U.S. Pat. No. 6,862,605, issued Mar. 1, 2005, to Wilber, which is hereby incorporated by reference as if fully contained herein, teaches an independent oscillator device and a method of generating random numbers. U.S. Pat. No. 6,324,558, issued Nov. 27, 2001, to Wilber, which is hereby incorporated by reference, teaches a random number generator (RNG) circuit connected to a general-purpose computer. The RNG circuit includes a flat source of white noise, and the circuit is powered by the computer. Examples of random number generators are described in detail below. In some embodiments of a detector 100, source 104 of non-deterministic random numbers includes a random noise source 106. A wide range of noise sources are suitable to provide random numbers in a source of non-deterministic random numbers in accordance with the invention. Examples include components exhibiting thermal noise and shot noise. Examples of shot noise sources include sources of electronic noise and photonic noise.

Source 104 of non-deterministic random numbers is operable to generate non-deterministic random numbers 110. In some embodiments of an anomalous effect detector, the source of non-deterministic random numbers is operable to generate non-deterministic random binary bits at a total rate exceeding one billion bits per second. In some embodiments, source 104 is operable to generate an analog non-deterministic random signal. In some embodiments, source 104 is operable to generate non-deterministic random numbers 110 having a bias less than 10 parts per million (ppm) and an autocorrelation less than 10 ppm for any order of autocorrelation. In some embodiments, source 104 is operable to generate non-deterministic random numbers 110 having a bias less than 1 ppm and an autocorrelation less than 1 ppm for any order. In some embodiments, source 104 of non-deterministic random numbers is located in an integrated circuit. In some embodiments, source 104 of non-deterministic random numbers comprises an independent ring oscillator. In some embodiments, source 104 of non-deterministic random numbers comprises a single electron transistor random source. In some embodiments, source 104 of non-deterministic random numbers comprises a summed multisource RNG.

As depicted in FIG. 1, anomalous effect detector 100 also includes a converter 114. A converter 114 is operable to accept an input 110 of non-deterministic random numbers from source 104 and to convert a property of non-deterministic random numbers 110 into a converter output 118. Converter 114 typically comprises one or more converters selected from a group including: a bias amplifier, an autocorrelation converter, a cross-correlation converter, a runs converter, a transitions converter, a mutual bias converter and a pattern correlation converter. A bias amplifier typically is operable to amplify bias of an input of non-deterministic random numbers. In some embodiments, a bias amplifier is operable to perform a bounded random walk. When a low amount of bias is present in the numbers, then a bias amplifier has a high statistical efficiency, approaching 1.0. For example, when a low amount of bias is present in the numbers, and if the bias amplifier uses one million input bits to produce one output bit, the bias is amplified by about 1000; that is, the bias is amplified by a factor equivalent to the square root of the decrease in total numbers. In some embodiments, a bias amplifier is operable to perform a truth table bias function. A pattern correlation converter uses an arbitrary pattern of bits. Converters are discussed in more detail below.

Anomalous effect detector 100 further comprises a processor 120. Processor 120 is operable to accept converter output 118 and to produce a processor output signal 124 representative of an influence of mind. A feature of anomalous effect detector 100 is that processor output signal 124 contains fewer numbers than input 110 of non-deterministic random numbers.

Anomalous effect detector 100 further includes an interface 130 that is operable to communicate results 124 from processor 120. An example of a results interface 130 includes: a computer monitor, a computer speaker, a sound transducer, an LED display, a cell phone screen, a cell phone speaker, a mechanical transducer and a physiological stimulator.

FIG. 2 contains a block diagram representing a more preferred general embodiment of an anomalous effect detector 140 in accordance with the invention. Anomalous effect detector 140 includes a source of non-deterministic random numbers 144. An exemplary source of non-deterministic random numbers comprises an independent oscillator random number generator (RNG). In some embodiments, source 144 of non-deterministic random numbers includes a random noise source 146. Source 144 of non-deterministic random numbers also includes a randomness corrector 148 that is operable to accept random numbers (or a random signal) 149 from noise source 146 and to reduce one or more statistical defects in the random numbers, thereby reducing statistical defects in non-deterministic random numbers 150. Randomness correctors and correcting randomness are described in more detail below. Source 144 of non-deterministic random numbers is operable to generate non-deterministic random numbers 150. In some embodiments, source 104 is operable to generate an analog non-deterministic random signal. In some embodiments, source 104 is operable to generate non-deterministic random binary bits. In some embodiments, randomness corrector 148 is operable to reduce bias in non-deterministic random numbers 150 to less than 10 ppm and to reduce autocorrelation of any order in non-deterministic random numbers 150 to less than 10 ppm. In some embodiments, randomness corrector 148 is operable to reduce bias in the non-deterministic random numbers 150 to less than 1 ppm and to reduce autocorrelation of any order in non-deterministic random numbers 150 to less than 1 ppm. In some embodiments, randomness corrector 148 comprises a linear feedback shift register randomness corrector. In some embodiments, randomness corrector 148 comprises a randomness corrector operable to perform a function selected from the group consisting of: XORing output numbers from the source of non-deterministic random numbers with the output of a pseudorandom number generator; XORing output numbers from the source of non-deterministic random numbers with the output of an independent non-deterministic random number generator; and XORing a number of consecutive output numbers of the source of non-deterministic random numbers.

As depicted in FIG. 2, anomalous effect detector 140 also includes a converter 154. Converter 154 is operable to accept an input 150 of non-deterministic random numbers from source 144 and to convert a property of non-deterministic random numbers 150 into a converter output 158. Converter 144 typically comprises one or more converters selected from a group including: a bias amplifier, an autocorrelation converter, a cross-correlation converter, a runs converter, a transitions converter, a mutual bias converter and a pattern correlation converter. A bias amplifier typically is operable to amplify bias of an input of non-deterministic random numbers. In some embodiments, a bias amplifier is operable to perform a bounded random walk. In some embodiments, a bias amplifier is operable to perform a truth table bias function. Converters are discussed in more detail below.

Anomalous effect detector 140 further comprises a processor 160. Processor 160 is operable to accept converter output 158. Anomalous effect detector 140 further comprises a source 162 of test numbers 163. Processor 160 is operable to measure a relationship between converter output 158 in processor 160 and at least one test number 163 from test number source 162 to produce a relationship measurement. Processor 160 is further operable to abstract a relationship measurement to provide an enhanced output signal 164 representative of an influence of mind. A feature of anomalous effect detector 140 is that processor output signal 164 contains fewer numbers than input 150 of non-deterministic random numbers. In some embodiments, a processor 120, 160 comprises a runs converter operable to convert runs in a relationship measurement in the processor into a bias in its output.

Generally, mind is associated with functions of the brain. For this reason, it is believed that performance improves in embodiments in accordance with the invention in which number sources and/or information processing nodes are arranged to emulate the processing of neurons in the brain. In some embodiments in accordance with the invention, a processor includes an artificial neural network.

In some embodiments, source 144 of non-deterministic random numbers is located in an integrated circuit. In some embodiments, source 144 of non-deterministic random numbers comprises an independent ring oscillator. In some embodiments, source 144 of non-deterministic random numbers comprises a single electron transistor random source. In some embodiments, source 144 of non-deterministic random numbers comprises a summed multisource RNG.

Anomalous effect detector 140 further includes an interface 170 that is operable to communicate results 164 from processor 160. As depicted in FIG. 2, in some embodiments, interface 170 communicates results to an operator 180. Anomalous effect detector 140 further comprises an initiator 190 that is operable to initiate detection by anomalous effect detector 140 of an influence of mind.

Examples of an initiator 190 include: a keypad, a touchpad, a computer keyboard, a computer mouse, a microphone, a mechanical transducer, a photo sensor, a capacitive switch, a touch sensitive screen, a physiological signal detector and another anomalous effect detector. In some embodiments, initiator 190 is operable to receive a conditioned physiological measurement to initiate a detection. In some embodiments, initiator 190 is operable to receive an output from another anomalous effect detector to initiate a detection. In some embodiments, initiator 190 is operable to initiate a detection automatically and periodically.

In some embodiments, source 162 of test numbers is operable to generate test numbers 163 having a fixed pattern. This feature is useful for assessing and training the ability of an operator to affect directly the properties of the physical source of non-deterministic random numbers by psychokinesis. In some embodiments, source 162 of test numbers is operable to generate at least one test number before initiation of detection of an influence of mind. This feature is useful for testing and training clairvoyance abilities of an operator. In some embodiments, source 162 of test numbers is operable to generate at least one test number after converting by converter 154 of input 150 to converter output 158. This feature is useful for testing and training precognition abilities of an operator.

Examples of a results interface 170 include: a television, a computer monitor, an LED display, a liquid crystal display, a plasma display, a 3-dimentional display, a laser display, an ionized air display, a projection type display, a sound transducer, a speaker, an earphone, a 3-dimentional sound system, an ultrasonic heterodyne transducer, a direct bone sound transducer, an electronic stimulator, a mechanical transducer, a direct electronic neural stimulator, a direct photonic neural stimulator or a direct electromagnetic neural stimulator. In some embodiments, the results interface is operable to produce a feedback to an operator within one second of the beginning of the generation of the stream of non-deterministic random numbers. In some embodiments, the results interface is located remotely from the processor. In some embodiments, the results interface is connected to the processor over the internet. In some embodiments, the results interface is connected to the processor via a telephone line. In some embodiments, the results interface is connected to the processor via a wireless connection. In some embodiments, the results interface comprises a portable device. In some embodiments, the results interface comprises an internet-enabled device. In some embodiments, output of processor results from processor 160 in results interface 170 function as positive or real-time feedback to an operator 180. It is understood that in some embodiments, feedback to an operator does not rise above the subliminal or unconscious level. Examples of subliminal feedback stimuli include: direct neuronal stimulation; electromagnetic stimulation, including light; and other subliminal sensory stimulation. Unconscious modalities may include sources of stimulation that may become large enough to reach the threshold of conscious awareness.

Accordingly, some embodiments of an anomalous effect detector in accordance with the invention further comprise one or more physiological sensors, that is, instruments operable to respond to one or more physiological parameters of an operator 180. Examples of such instruments include: a plethysmograph, a photoplethysmograph, an impedance plethysmograph, an oximeter, a respiration monitor, an expired gas monitor, an electrocardiograph, an electroencephalograph, a magnetoencephalograph, a device for measuring electrodermal response, a device for measuring skin electrical potentials, an electromyograph and a temperature sensor. Some embodiments further comprise a signal processor (not shown) that is responsive to one or more output signals of one or more physiological sensors. Examples of physiological parameters for which corresponding output signals are processed by a signal processor include: heart rate, blood flow, blood perfusion, heart pulse wave velocity, heart rate variability, muscle tension, electroencephalograms, power spectra of electroencephalograms, brain hemisphere ratios in electroencephalogram spectra, electrocardiograms, respiration rate and metabolism. Some embodiments of an anomalous effect detector in accordance with the invention comprise a results interface and a signal processor connected to the results interface, the results interface being operable to present an output corresponding to at least one of the physiological parameters.

Some embodiments of an anomalous effect detector in accordance with the invention further comprise a bias input operable to alter a probability of a property of the non-deterministic random numbers. Such a bias input allows probability feedback.

In some embodiments, a converter (e.g., converter 114, 154) comprises: a cross-correlation converter that is operable to convert cross-correlation between a plurality of simultaneously generated non-deterministic random numbers into a bias contained in a cross-correlation converter output; and a bias amplifier that is operable to amplify bias contained in a cross-correlation converter output. In some embodiments, a converter comprises: a runs converter that is operable to convert runs in the input of non-deterministic random numbers into a bias contained in a runs converter output; and a bias amplifier that is operable to amplify bias in the runs converter output. In some embodiments, a converter comprises: an autocorrelation converter that is operable to convert autocorrelation in an input of non-deterministic random numbers into a bias contained in an autocorrelation converter output; and a bias amplifier that is operable to amplify bias contained in the autocorrelation converter output. In some embodiments, a converter comprises: a cross-correlation converter that is operable to convert cross-correlation between a plurality of simultaneously generated non-deterministic random numbers into a bias contained in a cross-correlation converter output. In some embodiments, a converter comprises: a cross-correlation converter that is operable to convert cross-correlation between a plurality of simultaneously generated non-deterministic random numbers into a bias contained in a cross-correlation converter output; a runs converter that is operable to convert runs in the cross-correlation converter output into a bias contained in a runs converter output; and a bias amplifier that is operable to amplify bias contained in the runs converter output. In some embodiments, a converter comprises: a mutual bias converter operable to convert a mutual bias in a plurality of simultaneously generated non-deterministic random numbers into a bias contained in a mutual bias converter output, and a bias amplifier that is operable to amplify bias contained in the mutual bias converter output. Converters are described in more detail below.

A basic embodiment of a method of detecting an anomalous effect resulting from an influence of mind comprises: providing an input of non-deterministic random numbers; converting a property of the input of non-deterministic random numbers into a converter output; accepting the converter output into a processor; and producing in the processor a processor output signal representative of the influence of mind, wherein the processor output signal contains fewer numbers than the input of non-deterministic random numbers; and communicating results from the processor using an interface. Other embodiments of methods in accordance with the invention are clear from the descriptions herein. For example, some embodiments of a method of detecting an anomalous effect further comprise: providing at least one test number to the processor; measuring a relationship between the converter output in the processor and at least one test number to produce a relationship measurement; and in the processor, abstracting the relationship measurement to provide an enhanced output signal representative of the influence of mind.

An exemplary anomalous effect detector for responding to an influence of mind and an exemplary method of utilizing an anomalous effect detector are described in Example 1 below. The exemplary anomalous effect detector is described with reference to anomalous effect detector 140, depicted in FIG. 2. The exemplary method is described with reference to generalized method 200 outlined in the process flow sheet of FIG. 3. It is understood that numerous embodiments of apparatuses, techniques and methods in accordance with the invention deviate from the particular embodiments described herein.

Example 1

Computer programs, referred to herein as detector software, are installed in a conventional general-purpose personal computer to provide operability corresponding to the operability of source 144 of non-deterministic random numbers, converter 154, processor 160, test number source 162, results interface 170 and initiator 190. The personal computer includes a conventional low-frequency (LF) oscillator (or clock) having a frequency of about 1 kHz. The personal computer also includes a conventional high-speed, 64-bit counter. It is a feature of this exemplary embodiment that an anomalous effect detector in accordance with the invention is formed through operation of the detector software using the usual components of the personal computer. For example, the computer keyboard functions as an initiator device, corresponding to initiator 190 of anomalous effect detector 140 in FIG. 2. The computer screen and speaker function as results interfaces, corresponding to results interface 170. The LF oscillator, the high-speed counter, and the personal computer's conventional memory and processor together with true random number generator (TRNG) programs included in the detector software function as a noise source and a randomness corrector, corresponding to noise source 146 and randomness corrector 148 of source 144 of non-deterministic random numbers in anomalous effect detector 140. Similarly, the LF oscillator, the high-speed counter, and the personal computer's conventional memory and processor together with the detector software function to generate non-deterministic random test bits, corresponding to the function of source 162 of test numbers of anomalous effect detector 140. The personal computer's conventional memory and processor together with processing programs included in the detector software function as a processor, corresponding to processor 160 of anomalous effect detector 140 of FIG. 2.

In step 210 of method 200, the operator initiates a detection of an influence of mind with a press of a keyboard key or with a mouse click. In step 220, the next edge of the low-speed oscillatory signal of the computer's low-speed oscillator causes reading of the word contained in the high-speed counter. Then, bits containing entropy are extracted from the read word. Processes of step 220 are conducted substantially as follows. From the word read, the lower (i.e., the least significant) bits are selected. The number of these lower bits is approximately the number of bits that have changed since the previous read. In this exemplary embodiment in a 4 GHz personal computer using a 1 kHz sampling rate, about 22 bits change in the one millisecond between samples.

In step 230, bits containing entropy are processed by a randomness corrector to produce a non-deterministic random bit. The processes of step 230 are performed substantially as follows: the selected lower bits (the bits containing entropy) are XOR-ed with an equal number of bits from a pseudorandom number generator; the resultant 22 bits are all XOR-ed together to produce a single output bit containing almost 1.0 bit of entropy. The single output bit corresponds to one of the bits in stream 150 of non-deterministic random bits, as depicted in FIG. 2. Software-based pseudorandom generators are known in the art.

In steps 240, 250, and 254 a single output bit of stream 150 is converted in an iterative process that corresponds to the processing of converter 154 of anomalous effect detector 140. In step 240 of a first iteration of steps 240, 250, and 254, one non-deterministic random bit is XOR-ed with a pseudorandom (deterministic) bit to produce a quasi-random bit. In step 250, the quasi-random bit is processed in a bias amplifier comprising a bounded random walk. In this exemplary embodiment, the bounded random walk is a 1-dimensional bounded random walk, with two steps to each boundary. If the bounded random walk terminates at one designated boundary, then the result is "1". If the bounded random walk terminates at the other designated boundary, then the result is "0". Some alternative embodiments utilize a multi-dimensional bounded random walk. A bounded random walk is a mathematical technique that amplifies bias in a group of numbers. In step 254, if an output bit has been produced, it is accumulated in step 256. If an output bit has not been produced, the iterative process of steps 240, 250, and 254 is repeated. In a second and in further iterations, the one random bit is XOR-ed once again with a pseudorandom (deterministic) bit to produce a quasi-random bit. In step 250, the resulting sequence of quasi-random bits (i.e., the sequence of the quasi-random bit from step 240 of the first iteration plus the quasi-random bit resulting from step 240 in each subsequent iteration) is processed in a bias amplifier comprising a bounded random walk. Again in step 254, if an output bit has been produced, it is accumulated in step 256. If an output bit has not been produced, the iterative process of steps 240, 250, and 254 is repeated. An average of four iterations is performed to produce an output bit in step 250. A minimum of two iterations is necessary to produce an output bit in step 250. The number of iterations to produce an output bit occasionally reaches 20 to 30 iterations, but seldom exceeds 30 iterations. In this exemplary embodiment using a 1 kHz LF oscillator, a non-deterministic random bit is processed in the iterative bias-amplifying conversion process of steps 240, 250 and 254 at a rate of about 1000 bits per second to produce an output bit at a rate of about 1000 bits per second.

A step 256 includes accumulating 111 bias amplifier output bits. Step 258 includes determining if 111 bias amplifier output bits have accumulated. If not, processes 220 through 256 are repeated, as depicted in FIG. 3. If 111 bias amplifier output bits have accumulated, then step 260 is performed. Bias amplifier output bits correspond approximately to converter output 158 depicted in FIG. 2.

Step 260 includes comparing 111 bias amplifier output bits with 111 binary test bits. For each match, a "1" is generated. For each mismatch, a "0" is generated. Step 270 includes performing a majority vote based on the number of bias amplifier output bits that match a corresponding test bit. Steps 260 and 270 correspond to operations performed by processor 160 of anomalous effect detector 140 using test numbers provided by test number source 162. In more general terms, step 260 comprises measuring a relationship (i.e., match or mismatch) between the output of a converter (i.e., 111 output bits from bias amplifying) and a corresponding number of test numbers. In general terms, step 270 comprises abstracting the measured relationship by reducing 111 data bits to a single majority vote result.

Step 280 includes communicating the result of the majority vote to a computer monitor and a computer speaker, which correspond to results interface 170 of anomalous effect detector 140. The result of the majority vote is a "Hit" if the number of matches in step 270 is greater than 55. Otherwise, the result is a "Miss". Step 280 typically includes displaying the result of the comparison of step 270 to an operator 180 (FIG. 2).

FIG. 4 depicts a block diagram of a system 300 that comprises an anomalous effect detector in accordance with the invention and that is operable to practice a method in accordance with the invention of detecting an influence of mind. System 300 includes regulated power supplies 310, which are operable to provide electric power to a FPGA 320 (field programmable gate array). System 300 further comprises conventional general-purpose personal computer 330 and I/O (input/output) interface 340, which is operable to provide an interface between FPGA 320 and personal computer 330.

FPGA 320 is designed to provide to personal computer 330 operability corresponding to the operability of source 144 of non-deterministic random numbers, converter 154, processor 160 and test number source 162. Results interface 170 and initiator 190 are provided in personal computer 330. Some embodiments of a system in accordance with the invention include a different gate array device instead of or in addition to a FPGA. Examples of suitable gate arrays include an ASIC and a custom IC (integrated circuit).

Figure 5:
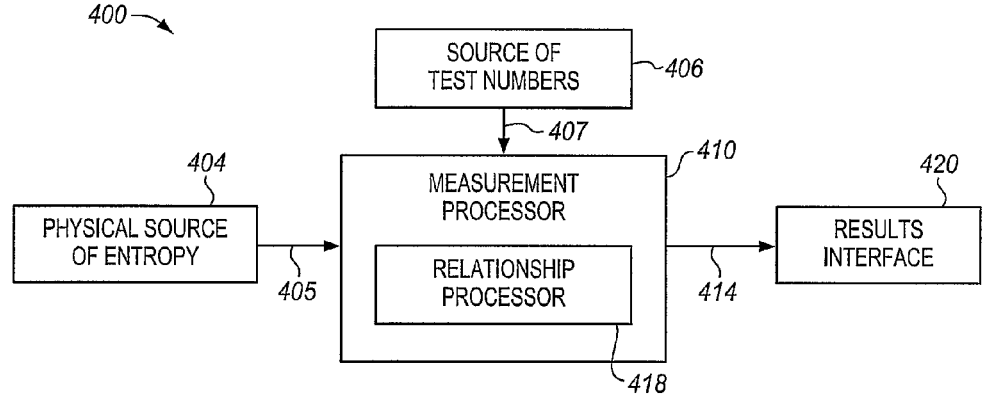
FIG. 5 depicts a block diagram of a quantum computer in accordance with the invention for responding to an influence of mind.

FIG. 5 depicts a block diagram of a quantum computer 400 in accordance with the invention for responding to an influence of mind. Quantum computer 400 comprises a physical source of entropy 404 operable to generate output numbers 405. Quantum computer 400 is operable to use quantum effects to generate results 414 representative of an influence of mind. A wide range of entropy sources are suitable to provide entropy contained in a physical source of entropy in accordance with the invention. Examples include thermal noise and shot noise. Examples of shot noise sources include sources of electronic noise and photonic noise. Examples of quantum mechanical entropy sources include: spin direction, photon polarization, nuclear decay, state transition timing, a photon beam splitter, and a single-electron transistor. In some embodiments, physical source of entropy 404 is located in an integrated circuit. In some embodiments, physical source of entropy 404 comprises an independent ring oscillator. In some embodiments, physical source of entropy 404 comprises a single electron transistor random source. In some embodiments, physical source of entropy 404 comprises a quantum circuit embodying a qubit. In some embodiments, physical source of entropy 404 comprises a quantum circuit embodying at least one qubit, which qubit exhibits a property of quantum entanglement. In some embodiments, physical source of entropy 404 comprises an independent oscillator random number generator (RNG). U.S. Pat. No. 6,862,605, issued Mar. 1, 2005, to Wilber teaches an independent oscillator device and a method of generating random numbers.

Quantum computer 400 further comprises a source 406 of test numbers 407. Quantum computer 400 further comprises a measurement processor 410. Measurement processor 410 is operable to accept output numbers 405 from entropy source 404. Measurement processor 410 is further operable to measure a relationship between process numbers in measurement processor 410 and at least one test number 407 to produce an output 414 representative of an influence of mind. Accordingly, measurement processor 410 comprises a relationship processor 418, which is operable to measure a relationship between process numbers in measurement processor 410 and at least one test number 407. In some embodiments, a measurement processor 410 comprises a runs converter operable to convert runs in a relationship measurement in the processor into a bias.

Quantum computer 400 further comprises a results interface 420 that is operable to communicate results from measurement processor 410. An example of a results interface 420 includes: a computer monitor, a computer speaker, a sound transducer, an LED display, a cell phone screen, a cell phone speaker, a mechanical transducer and a physiological stimulator.

In some embodiments, entropy source 404 is operable to generate digital output numbers. In some embodiments, source 404 is operable to generate an analog output signal. In some embodiments, physical source of entropy 404 is located in an integrated circuit. In some embodiments, physical source of entropy 404 comprises an independent ring oscillator. In some embodiments, physical source of entropy 404 comprises a single electron transistor random source. In some embodiments, physical source of entropy 404 comprises a quantum circuit embodying a qubit. In some embodiments, physical source of entropy 404 comprises a quantum circuit embodying at least one qubit, which qubit exhibits a property of quantum entanglement. In some embodiments, physical source of entropy 404 comprises a summed multisource RNG.

An exemplary relationship processor 418 is operable to measure a relationship between process numbers in measurement processor 410 and test numbers 407. In some embodiments, as explained above in Example 1 with reference to method 200 of FIG. 3, process numbers are directly compared to test numbers; then, a majority vote of the comparison results is performed. In some embodiments, process numbers are directly compared to test numbers; then, a runs analysis is performed on a sequence of bits resulting from the comparison. In some embodiments, a cross-correlation is performed between process numbers and test numbers.

Figure 6:
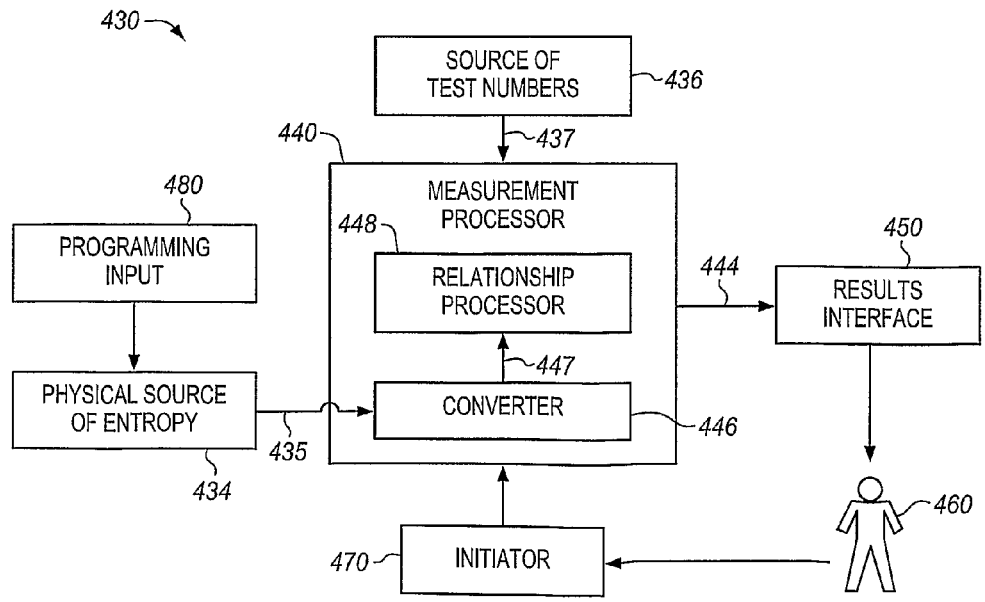
FIG. 6 depicts a block diagram of a preferred quantum computer in accordance with the invention for responding to an influence of mind.

FIG. 6 depicts a block diagram of a preferred embodiment of quantum computer 430 in accordance with the invention for responding to an influence of mind. Quantum computer 430 comprises a physical source of entropy 434 operable to generate output numbers 435. Quantum computer 430 is operable to use quantum effects to generate output numbers 435. A wide range of entropy sources are suitable to provide entropy contained in a physical source of entropy in accordance with the invention. In some embodiments, source 434 is operable to generate output numbers 435 having a bias less than 10 ppm and an autocorrelation less than 10 ppm for any order of autocorrelation. In some embodiments, source 434 is operable to generate output numbers 435 having a bias less than 1 ppm and an autocorrelation less than 1 ppm for any order. In some embodiments, physical source of entropy 434 is located in an integrated circuit. In some embodiments, physical source of entropy 434 comprises an independent ring oscillator. In some embodiments, physical source of entropy 434 comprises a single electron transistor random source. In some embodiments, physical source of entropy 434 comprises a quantum circuit embodying a qubit. In some embodiments, physical source of entropy 434 comprises a quantum circuit embodying at least one qubit, which qubit exhibits a property of quantum entanglement. In some embodiments, physical source of entropy 434 comprises an independent oscillator RNG. In some embodiments, physical source of entropy 434 comprises a summed multisource RNG.

Quantum computer 430 further comprises a source 436 of test numbers 437. Quantum computer 430 further comprises a measurement processor 440. Measurement processor 440 is operable to accept output numbers 435 from entropy source 434. Measurement processor 440 is further operable to measure a relationship between process numbers in measurement processor 440 and at least one test number 437 to produce an output 444 representative of an influence of mind. Measurement processor 440 includes a converter 446 that is operable to convert output numbers 435 from the physical source of entropy 434 to a converter output 437 representative of a property of the output numbers. In some embodiments, a measurement processor 440 comprises a runs converter operable to convert runs in a relationship measurement in the processor into a bias. Measurement processor 440 further includes a relationship processor 448, which is operable to measure a relationship between output numbers 447 from converter 446 and at least one test number 437. Quantum computer 430 further comprises a results interface 450 that is operable to communicate results 444 from measurement processor 440. As depicted in FIG. 6, in some embodiments, interface 450 communicates results to an operator 460. Quantum computer 430 further comprises an initiator 470 that is operable to initiate a detection of an influence of mind.

In some embodiments, entropy source 434 is operable to generate digital output numbers. In some embodiments, source 434 is operable to generate an analog output signal.

Converter 446 typically comprises one or more converters selected from a group including: a bias amplifier, an autocorrelation converter, a cross-correlation converter, a runs converter, a transitions converter, a mutual bias converter and a pattern correlation converter. A bias amplifier typically is operable to amplify bias of output numbers from entropy source 434. In some embodiments, a bias amplifier is operable to perform a bounded random walk. In some embodiments, a bias amplifier is operable to perform a truth table bias function.

In some embodiments, a converter 446 comprises: a cross-correlation converter that is operable to convert cross-correlation between a plurality of simultaneously generated output numbers 435 from physical source of entropy 434 into a bias contained in a cross-correlation converter output; and a bias amplifier that is operable to amplify bias contained in the cross-correlation converter output. In some embodiments, a converter 446 comprises: a runs converter that is operable to convert runs in output numbers 435 from physical source 434 of entropy into a bias contained in a runs converter output; and a bias amplifier that is operable to amplify bias in the runs converter output. In some embodiments, a converter 446 comprises: an autocorrelation converter that is operable to convert autocorrelation in output numbers 435 from physical source of entropy 434 into a bias contained in an autocorrelation converter output; and a bias amplifier that is operable to amplify bias contained in the autocorrelation converter output. In some embodiments, a converter 446 comprises: a cross-correlation converter that is operable to convert cross-correlation between a plurality of simultaneously generated output numbers 435 from a physical source of entropy 434 into a bias contained in a cross-correlation converter output. In some embodiments, a converter 446 comprises: a cross-correlation converter that is operable to convert cross-correlation between a plurality simultaneously generated output numbers 435 from a physical source 434 of entropy into a bias contained in a cross-correlation converter output; a runs converter that is operable to convert runs in the cross-correlation converter output into a bias contained in a runs converter output; and a bias amplifier that is operable to amplify bias contained in the runs converter output. In some embodiments, a converter comprises: a mutual bias converter operable to convert a mutual bias in a plurality of simultaneously generated output numbers 435 into a bias contained in a mutual bias converter output; and a bias amplifier that is operable to amplify bias contained in the mutual bias converter output. Converters are discussed in more detail below.

In some embodiments, source 436 of test numbers is operable to generate test numbers 437 having a fixed pattern. This feature is useful for assessing and training the ability of an operator to affect directly the properties of the physical source of non-deterministic random numbers by psychokinesis. In some embodiments, source 436 of test numbers is operable to generate at least one test number before initiation of detection of an influence of mind. This feature is useful for testing and training clairvoyance abilities of an operator. In some embodiments, source 436 of test numbers is operable to generate at least one test number 437 after converting by converter 446 of output numbers 435 to converter output 447. This feature is useful for testing and training precognition abilities of an operator.

An exemplary relationship processor 448 is operable to measure a relationship between process numbers in measurement processor 440 and test numbers 437. In some embodiments, as explained above in Example 1 with reference to method 200 of FIG. 3, process numbers are directly compared to test numbers; then, a majority vote of the comparison results is performed. In some embodiments, process numbers are directly compared to test numbers; then, a runs analysis is performed on a sequence of bits resulting from the comparison. In some embodiments, a cross-correlation is performed between process numbers and test numbers.

Some embodiments of a quantum computer 430 further comprise a programming input 480 operable to alter a probability function of physical source of entropy 434. A programming input can be used to alter the wavefunction of one or more qubits. In some embodiments, the signal supplied to the programming input is derived from the measured states of other qubits or from a conditional processed signal. A conditional, or non-final, signal is produced from a previous one or more measurements and processing. This provides a means of enhancing both the accuracy and speed of providing a final processed output representative of an influence of mind.

An example of a technique to alter a probability function of a physical source of entropy is to adjust the threshold level of converting an analog signal to binary. This changes the probability of getting a "1" or "0". Another example is to change the duty cycle of a square wave being sampled; for example the square wave of a ring oscillator. Another example of altering a probability function is to adjust autocorrelation by adjusting the transfer function of the filter through which a signal is passing.

Examples of an initiator 470 include: a keypad, a touchpad, a computer keyboard, a computer mouse, a microphone, a mechanical transducer, a photo sensor, a capacitive switch, a touch sensitive screen, a physiological signal detector and another anomalous effect detector. In some embodiments, initiator 470 is operable to receive a conditioned physiological measurement to initiate a detection. In some embodiments, initiator 470 is operable to receive an output from another anomalous effect detector to initiate a detection. In some embodiments, initiator 470 is operable to initiate a detection automatically and periodically once started.

In some embodiments, quantum computer 430 also includes a randomness corrector that is operable to accept output numbers 435 (e.g., digital numbers or an analog signal) from entropy source 434 and to reduce one or more statistical defects in the output numbers. Randomness correctors and correcting randomness are described in more detail below. One or more techniques are applied for reducing defects in an analog signal. For example, in some embodiments, physical source of entropy 434 produces an analog output 435 in which the average voltage is not zero. This defect is reduced by using a negative feedback to cancel out a long-term average voltage. This is a simple technique and leaves the signal intact. Another technique used to reduce defects is to multiply the analog signal by a random sequence of "1s" and "minus 1s". This reduces autocorrelation and bias, but does not leave the wave signal intact. Another technique is to multiply the signal by a pseudorandomly generated analog wave having perfect statistics. Then, the absolute value of the analog signal is calculated, and then the square root of the absolute value is calculated. Finally, the positive and negative signs of the original signal wave sections are re-applied to get a signal with reduced defects.

In some embodiments, a randomness corrector in quantum computer 430 is operable to reduce bias in output numbers 435 to less than 10 ppm and to reduce autocorrelation of any order in non-deterministic random numbers 435 to less than 10 ppm. In some embodiments, a randomness corrector is operable to reduce bias in output numbers 435 to less than 1 ppm and to reduce autocorrelation of any order in non-deterministic random numbers 435 to less than 1 ppm. In some embodiments, a randomness corrector comprises a linear feedback shift register randomness corrector. In some embodiments, a randomness corrector comprises a randomness corrector operable to perform a function selected from the group consisting of: XORing output numbers from the physical source of entropy with the output of a pseudorandom number generator; XORing output numbers from the physical source of entropy with the output of an independent non-deterministic random number generator; and XORing a plurality of consecutive output numbers of the physical source of entropy.

A basic embodiment of a method of using a quantum computer that is responsive to an influence of mind comprises: generating output numbers using a physical source of entropy; providing at least one test number; accepting the output numbers in a measurement processor; measuring a relationship between process numbers in the measurement processor and at least one test number to produce an output representative of an influence of mind; and communicating results from the measurement processor using an interface. Other embodiments of a method of using a quantum computer are clear from the descriptions of the quantum computer herein.

FIG. 7 contains a block diagram illustrating a general embodiment of a multi-stream RNG 500 in accordance with the present invention. Multi-stream RNG 500 includes noise diode 510, which is a source of random noise operable to generate an analog signal 512. Types of devices suitable for use as a source 510 of random noise include, for example, a noise diode, a zener diode, a photodiode, an avalanche diode, a semiconductor junction, a resistor and a radiation detector.

Multi-stream RNG 500 further includes analog-to-digital converter (ADC) 520. ADC 520 is operable to convert analog signal 512 to n number of ADC output lines 522, wherein n≧2. As depicted in FIG. 7, ADC 520 has n=8 output lines 522. Typically, multi-stream RNG 500 further includes one or more amplifiers 524 to adjust the amplitude of analog noise signal 512 provided by noise source 510 before the noise signal enters ADC 520. The amplified noise signal preferably has an average peak-to-peak amplitude about equal to the full-scale input range of ADC 520. Preferably, the analog signal 512 of noise source 510 and ADC 520 together have a full-power bandwidth about two times the sampling frequency of ADC 520. In other words, the total transfer function of the analog signal path preferably has a full power bandwidth of twice the sampling frequency of ADC 520.

Depending on the intended use of a multi-stream RNG and of the sequences of random numbers it generates, the minimum amount of entropy in the sequences from each of the output lines is optimized by selecting the number m of output lines that are corrected in randomness correctors. Preferably, selection of the number m of output lines to be corrected from the total number n of ADC output lines is conducted through mathematical modeling and simulation in accordance with the invention. The number of lines n to be used can be determined by theoretically modeling the cross-correlation matrix of all the output lines while varying the RMS or peak-peak amplitude of the of the ADC input signal relative to the full-scale input range of the ADC. The cross-correlation increases for the pairs of more significant bits. The cross-correlation is related to the mutual entropy in the pairs of sequences, so the input amplitude and the number of less-significant bits is adjusted to achieve the desired level of independent entropy in the selected number of sequences n.

Non-deterministic random bits generated in accordance with the invention have true entropy. As a result, random data generated in accordance with the invention are able to be influenced by mind.

Exemplary commercially-available noise diodes suitable for use as a noise source 510 in a random number generator in accordance with the invention include: NoiseCom NC 302LBL; Panasonic MAZ80620ML. An exemplary amplifier suitable for use as an amplifier 524 is a MAR-65M available from Microcircuits. Exemplary analog-to-digital converters suitable for use as an ADC 520 include: ADC 08200 CIMT (200 MHz) and ADC 081000 (1 GHz), both available from National Semiconductor.

FIG. 8 contains a block diagram of a self-seeding randomness corrector 540 suitable for use with a random number generator in accordance with the invention, such as multi-stream random number generator 500. Randomness corrector 540 typically comprises data input 542 to receive data 543 (e.g., an uncorrected sequence of bits); for example, data from an output line 522 of ADC 520. Randomness corrector 540 also includes serial shift register (SSR) 550 having a plurality of latches 552 and a plurality of shift intervals 554 (e.g., L1, L2, L3, L4). Randomness corrector 540 includes a plurality of parallel data taps 558, each data tap located at a latch. Randomness corrector 200 further comprises a nonlinear combining element 560, which is operable to accept data 543 via input 542, to accept data from a plurality of parallel data taps 558, to combine input data 543 and the data 562 from parallel data taps 558 into a corrected bit 564, and for inputting corrected bit 564 into an input of SSR 550. A data clock 568 is operable to shift data through randomness corrector 200. As data is clocked by data clock 568 during operation, typically the following occurs: a corrected data bit 564 is sampled (read) in line 570 from the nonlinear combining element 560; corrected bit 564 enters SSR 550; a new data bit 543 is input into nonlinear combining element 560; and data bits 562 from parallel data taps 558 move into nonlinear combining element 560.

Each shift interval of SSR 550 corresponds to a predetermined number of bit shifts. In preferred embodiments, randomness corrector 540 is operable to sample a plurality of parallel SSR output signals from a plurality of sampling data taps that are separated from each other by relatively prime shift intervals.

In some embodiments, a plurality of data taps are connected to an input of a nonlinear combining element, the plurality of connected data taps being separated from each other by relatively prime shift intervals. In some embodiments, a randomness corrector comprises a plurality of shift registers connected in series.

Examples of devices that are suitable to function as nonlinear combining element 560 include: an Exclusive-Or (XOR) gate, a parity generator, a binary adder with carry, a binary subtracter with borrow, a look-up table, or a pseudorandom number generator.

An exemplary randomness corrector 530 comprises an FPGA having part number EP1C3T144C6, available from Altera.

FIG. 9 depicts schematically an XOR gate 580 suitable for use in accordance with the invention. As depicted in FIG. 9, a data input (DI) line and a plurality of parallel SSR output (D1-D4) signals enter into XOR gate 580, which produces an output data bit 564.

FIG. 10 depicts schematically parity generator 590 suitable for use in accordance with the invention. As depicted in FIG. 10, a data input (DI) line 543 and a plurality of parallel SSR output (D1-D4) signals 562 enter into parity generator 590, which produces an output data bit 564.

Figure 11:
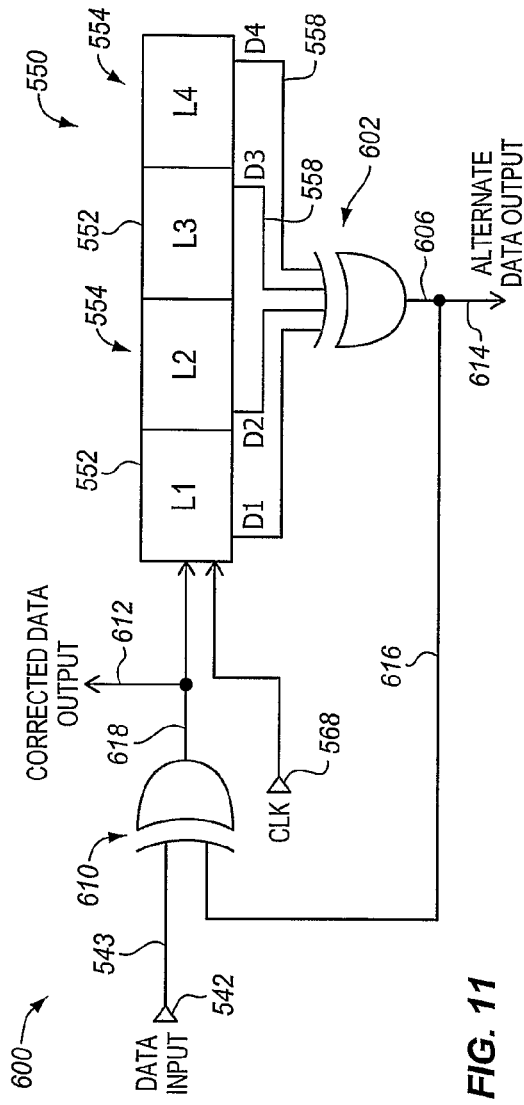
FIG. 11 contains a block diagram of another self-seeding randomness corrector suitable for use with a random number generator in accordance with the invention.

FIG. 11 contains a block diagram of another self-seeding randomness corrector 600 suitable for use with a random number generator in accordance with the invention, such as multi-stream random number generator 500. Randomness corrector 600 comprises a nonlinear combining element 602, which is operable to accept data (D1-D4) from a plurality of parallel data taps 558 of a serial shift register (SSR) 550 and to combine the data (D1-D4) from parallel data taps 558 of latches 552 into a line 606, which is input for nonlinear combining element 610. The output 612 of randomness corrector 600 serves as alternate data output 614 of a corrected sequence of random bits. Nonlinear combining element 610 is operable to accept input data 543 via input 542 (e.g., from a selected one of the output lines 522 of ADC 520), and to accept data from line 616, for the purpose of combining input 543 (e.g., the one selected ADC output line) and the data from line 616 into a corrected sequence of bits 618, and for inputting the corrected sequence 618 of bits into an input of SSR 550. In an exemplary randomness corrector 600, all logic is implemented inside an Altera FPGA EP1C3T144C6. As described with reference to FIG. 11, SSR 550 contains four shift intervals 554. It has been observed that four shift intervals is a minimum number of shift intervals for good results. It is understood, however, that some embodiments in accordance with the invention include more than four shift intervals. It is also understood that in some embodiments in accordance with the invention, a SSR 550 in a randomness corrector 600 contains only two or three shift intervals.

Figure 12:
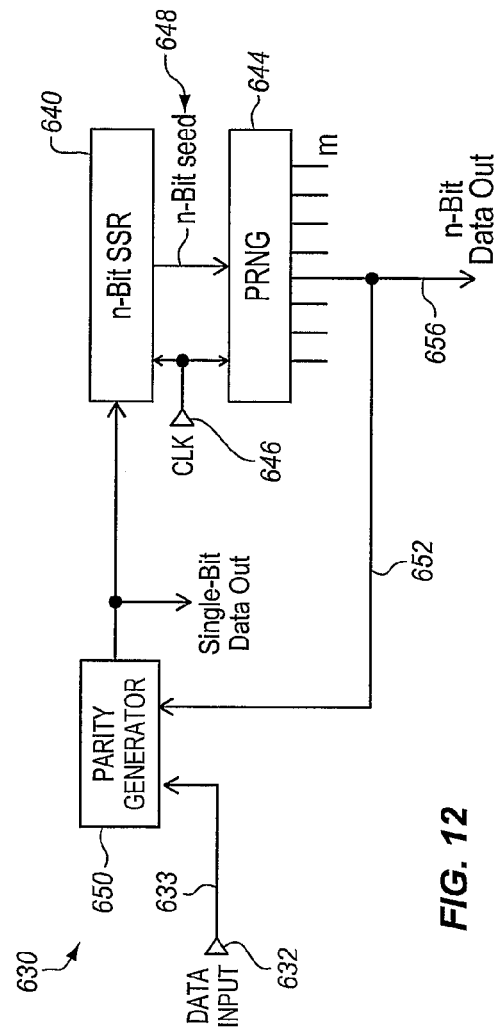
FIG. 12 contains a block diagram of another self-seeding randomness corrector suitable for use with a random number generator in accordance with the invention.

FIG. 12 contains a block diagram of another self-seeding randomness corrector 630 suitable for use with a random number generator in accordance with the invention, such as multi-stream random number generator 500. Randomness corrector 630 typically comprises data input 632 to receive data 633 (e.g., an uncorrected sequence of bits); for example, data from an output line 522 of ADC 520. Randomness corrector 630 also includes n-bit serial shift register (SSR) 640, which is a serial-in—parallel-out type shift register. Randomness corrector 630 includes a plurality of parallel data taps (not shown), each data tap located at a latch (similar to data taps 558 and latches 552 depicted in FIGS. 8 and 11). Randomness corrector 630 further comprises a pseudo-random number generator (PRNG) 644 and a data clock 646. Upon clocking of data clock 646, SSR 640 is operable to produce an output word 648 containing n bits as an input for PRNG 644. Randomness corrector 630 further comprises a nonlinear combining element 650, which is a parity generator. Parity generator 650 is operable to accept data 633 via input 632 and to accept data 652 from PRNG 644. Randomness corrector 630 is operable so that a single corrected data bit is sampled or an n-bit quasi-random word is sampled at data lines 656.

In some embodiments, a randomness corrector in accordance with the invention is operable to generate one or more bits of output 570, 612, 656 for every input bit at input 542, 632. In accordance with the invention, a data clock 568, 646 is operable to clock a plurality of times for every bit input. For example, if a clock clocks four times for every bit of input, the randomness corrector generates four corrected bits out for each input bit. In such a case, each output bit has about one fourth of the original entropy; i.e., the output bit is quasi-random.

In some embodiments, a randomness corrector comprises k number of serial shift registers (SSRs), wherein k>m (m being the number of selected ADC output lines or other independent sources of random numbers), each shift register having a plurality of latches and a plurality of shift intervals. Furthermore, each shift register includes a plurality of parallel sampling data taps that are relatively prime to each other. Such a randomness corrector includes a nonlinear combining element for each of the k shift registers, the nonlinear combining element being operable to accept data from a selected one of the m ADC output lines, to accept data from a plurality of parallel data taps, to combine the one selected ADC output line and the data from parallel data taps into a corrected output bit, and to input the corrected output bit into an input of the SSR. A data clock is operable to clock data through the randomness corrector.

In some embodiments of a random number generator in accordance with the invention, an ADC is operable so that the n number of ADC output lines have an aggregate bit rate of n times the sampling frequency of the ADC. In some embodiments, the ADC is operable so that the n number of ADC output lines have an aggregate bit rate greater than one billion bits per second. In some embodiments, m number of randomness correctors are operable so that m number of corrected sequences of bits have an aggregate bit rate greater than one billion bits per second. In some embodiments, m number of randomness correctors are operable so that m number of corrected sequences of bits have an aggregate bit rate greater than six billion bits per second. In some embodiments, m number of randomness correctors are operable so that m number of corrected sequences of bits have an aggregate bit rate greater than twelve billion bits per second.

Figure 13:
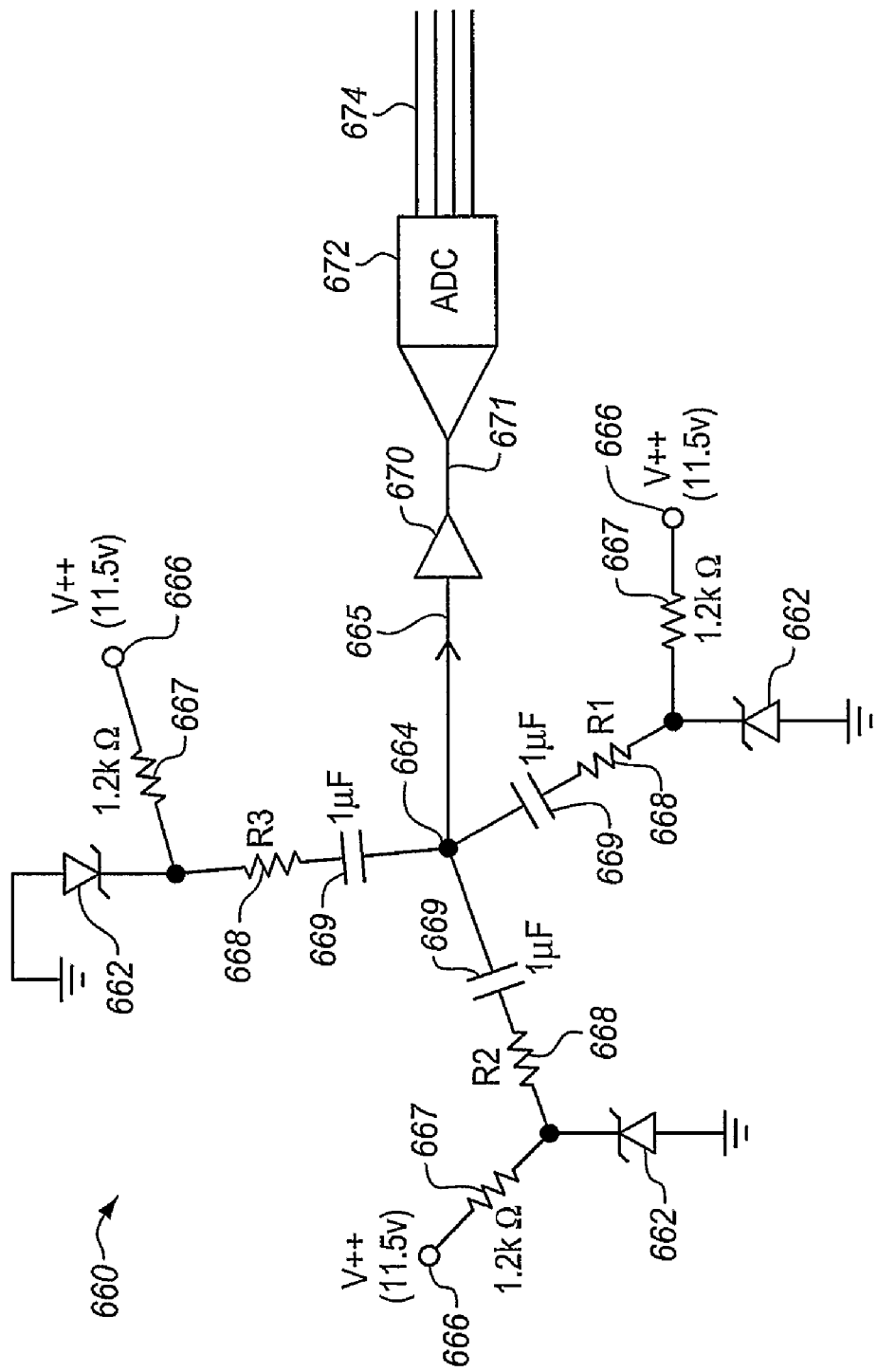
FIG. 13 shows a simplified diagram of a summed multi-source random number generator in accordance with the invention having a plurality of independent noise sources of random noise coupled at a summing point.

FIG. 13 shows a simplified block diagram of a summed multisource random number generator 660 in accordance with the invention having a plurality of independent noise sources 662 of random noise coupled at a summing point 664 and being operable to generate a signal 665 at the summing point. Examples of independent sources of random noise include: a noise diode, a zener diode, a photodiode, an avalanche diode, a superconductive junction, a resistor and a radiation detector. Some embodiments further comprise a coupler 668 and 669, the coupler being connected to the sources of random noise and being operable to couple the sources of random noise at summing point 664. In some of these embodiments, the coupler is operable to couple the sources of random noise using electromagnetic fields. Examples of a coupler include: a wire, a resistor, a variable resistor, a capacitor, a variable capacitor, an optically controlled resistor, an electronically controlled resistor, a photodiode, a converter, a delay line and a controllable delay line.

Summed multisource RNG 660 includes bias voltages 666 and bias resistors 667. Exemplary bias resistors have a resistance of 1.2 kilo-ohms (kΩ). Weighting resistors 668 have a resistance in a range of about from zero to 100 ohms. The resistance R1, R2 and R3 of three weighting resistors 668 are different so that noise sources 662 are weighted differently. The three capacitors 669 having a value of about 1 microfarad (µF) serve to decouple the DC components of noise diodes 662 from each other and from the input of amplifier 670. Amplifier 670 is located between summing point 664 and analog to digital converter (ADC) 672 and is operable to adjust signal 665 to signal 671.

ADC 672 has at least one ADC output line 674 and is responsive to the amplified signal 671 to produce random numbers in at least one ADC output line 674. In exemplary embodiments, non-deterministic random numbers produced by summed multisource RNG 660 serve as an input to a converter.

Some embodiments comprise at least three independent sources of random noise and are characterized in that the at least three independent sources of random noise are spatially arranged to form one or more triangles. In some embodiments, the independent sources of random noise are part of a monolithic integrated circuit. In some embodiments, the independent sources of random noise are all contained within a spherical radius of 0.5 mm. In some embodiments, the independent sources of random noise are coupled to simulate neuronal connections in a brain. In some embodiments, one or more output lines 674 of summed multisource random number generator 660 are the input of at least one randomness corrector that is operable to process the at least one ADC output line 674.

In some embodiments, a source of non-deterministic random numbers comprises an independent ring oscillator. In some embodiments, a physical source of entropy comprises an independent ring oscillator.

A ring oscillator is formed by connecting an odd number of inverting logic gates in a ring. The frequency of oscillation is proportional to the inverse of the number of logic gates used in the ring.

Figure 14:
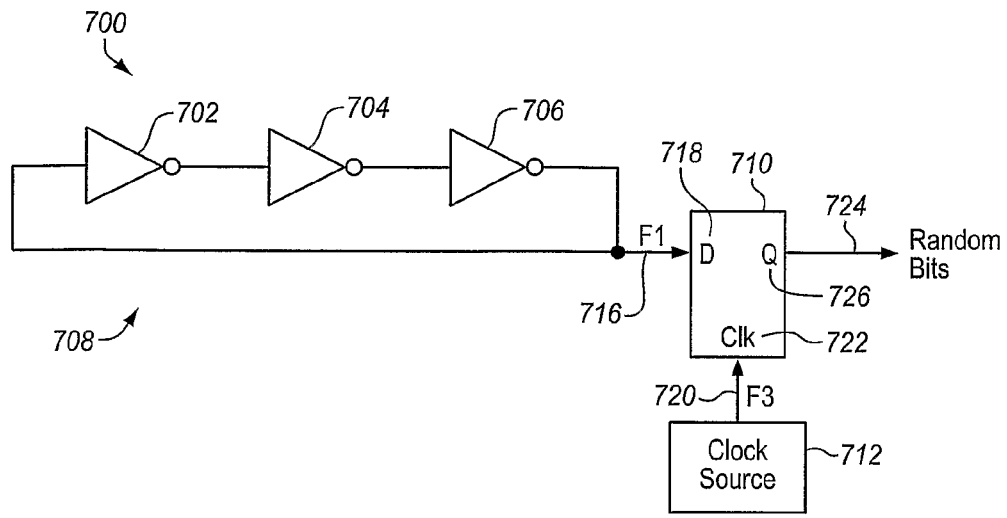
FIG. 14 depicts schematically a simple ring oscillator random number generator (RNG) in accordance with the invention.

FIG. 14 depicts schematically a simple ring oscillator random number generator (RNG) 700. Ring oscillator RNG 700 comprises inverting logic gates 702, 704 and 706 connected in a ring 708. Ring oscillator random number generator 700 further comprises a data latch 710 and a clock source 712. Ring oscillator 708 produces a high-frequency signal (F1) 716, which is applied to the data input 718 of data latch 710. Clock source 712 supplies a clock signal (F3) 720 to the clock input of latch 710. The frequency of clock signal (F3) 720 is lower than high-frequency signal (F1) 716. Random bits 724 are latched out on the Q output 724 of the latch at the clock signal frequency.

The entropy of the random sequence produced by ring oscillator RNG 700 depicted in FIG. 14 arises from the analog components that comprise the inverting gates 702, 704 and 706. Noise sources in these components include shot noise and thermal noise, as well as noise induced by power supply variations. The noise sources produce small variations in the timing of the rise and fall of the oscillator signal. These variations are known as transition jitter, or just jitter.

The amount of entropy is related to the root-mean-square (RMS) jitter as a fraction of the ring oscillator period. The jitter in an integrated circuit ring oscillator is only about 1 percent of the oscillator period for oscillator frequencies of several hundred MHz. Therefore, the entropy of a simple ring oscillator RNG 700 of FIG. 14 is also small.

Figure 15:
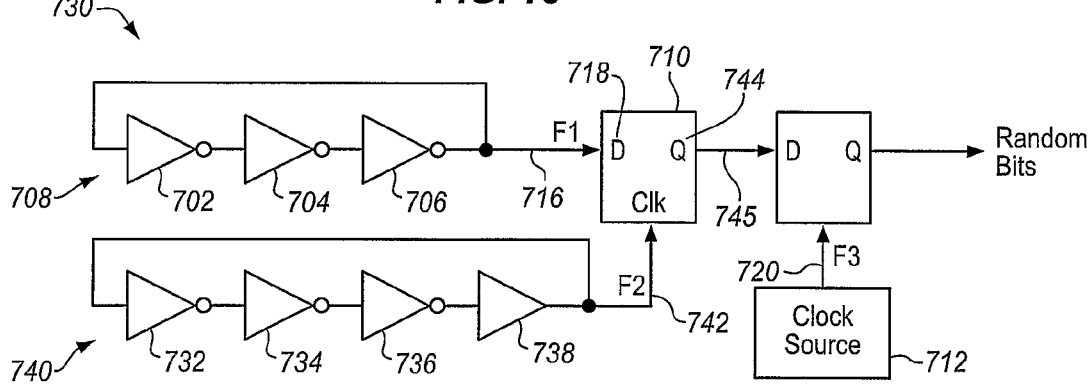
FIG. 15 shows an enhanced ring oscillator RNG in accordance with the invention.

FIG. 15 shows an enhanced ring oscillator RNG 730. Ring oscillator RNG 730 comprises inverting logic gates 702, 704 and 706 connected in a ring 708. Ring 708 produces a high-frequency signal (F1) 716, which is applied to the data input 718 of data latch 710. Ring oscillator RNG 730 further comprises inverting logic gates 732, 734 and 736 and non-inverting logic gate 738 in a second ring oscillator 740. Second ring oscillator 740 produces a high-frequency signal (F2) 742 at a lower frequency than signal 716 (F1). Second ring oscillator 740 supplies a signal 742 (F2) to the clock input of latch 710. The combined jitter of the two ring oscillators 708 and 740 increases the total entropy at output 744 of first latch 710. The output 745 of first latch 710 is in turn latched by a clock signal (F3) 720 of clock source 712 at a frequency lower than either signal F1 or F2. In some embodiments, clock 712 is a system clock so that the random bits produced by the embodiment of ring oscillator RNG 730 are synchronized with a specific clock.

In some embodiments, it is desirable that the entropy of the random bits be greater than the entropy of bits produced by a ring oscillator RNG 700 or 730. In an anomalous effect detector or a quantum computer in accordance with the invention, good results are obtained with entropy values of at least 0.9 bits per bit, up to 0.99 bits per bit. Entropy values above 0.99 have little incremental benefit. Combined RMS jitter values of 20-30 percent correspond to entropy levels of 0.9-0.99. U.S. Pat. No. 6,862,605, issued Mar. 1, 2005, to Wilber, which is incorporated by reference, teaches a random number generator comprising software that is operable utilizing only elements usually contained in a general purpose computer, and a general method for calculating entropy using the amount of jitter in various oscillatory signals.

Figure 16:
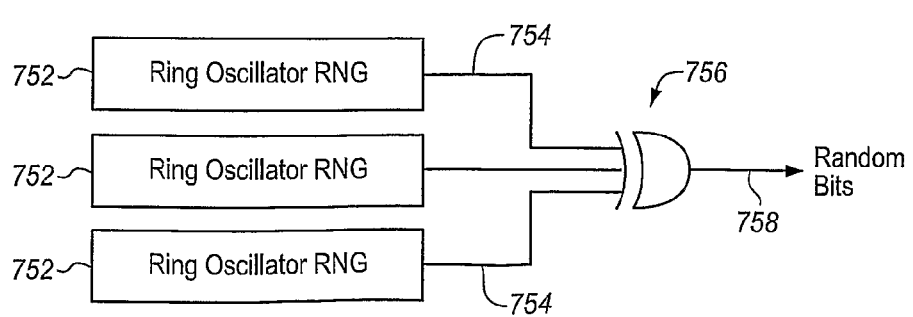
FIG. 16 depicts schematically a random number generator system in accordance with the invention comprising a plurality of independent ring oscillator RNGs.

FIG. 16 depicts schematically a random number generator system 750 comprising a plurality of independent ring oscillator random number generators 752, all clocked by a common clock source F3 (not shown). The random bits 754 from each of independent generators 752 are combined in an Exclusive-OR (XOR) gate. The output 758 of the XOR gate contains entropy from all of the plurality of XOR input bits 754. The number of independent generators 752 combined this way is increased until the final output bits 758 contain the desired entropy.

In some embodiments, a converter is operable to perform at least one truth table function. Generally, a truth table function in accordance with the invention is operable to accept an input comprising a subsequence of non-deterministic random binary bits having f number of bits and to generate an output having g number of bits, wherein $f \geq 2$ and $0 \leq g < f$. Generally, a truth table function is operable to accept input bits having an input bit rate, and to generate output bits having an output bit rate less than or equal to the input bit rate.

In some embodiments, truth table functions are performed using logic gates. For example, truth table functions for auto-correlation and cross-correlation converters are implemented by one or more two-input exclusive-NOR (XNOR) gates. In some embodiments, truth table functions are performed using software algorithms.

In some embodiments in accordance with the invention, a converter comprises a plurality of truth table functions. Some embodiments comprise one or more integrated circuit operable to perform one or a plurality of truth table functions. Examples of suitable integrated circuits include discrete logic chips, CPLDs, integrated logic circuits, and ASICs. In some embodiments, the converter comprises a field-programmable logic array programmed to perform one or a plurality of truth table functions. Some embodiments comprise a plurality of substantially identical truth table functions.

Generally, a truth table function is operable to accept an input comprising a subsequence of non-deterministic random binary bits having s number of bits and for generating an output having t number of bits, wherein $s \geq 2$ and $0 \leq t < s$. When present, one or more subsequent truth table functions are operable to accept an input comprising u number of output bits from a prior truth table function and generating an output having v number of bits, wherein $u \geq 2$ and $0 \leq v < u$. In some embodiments, $t < s/2$. In some embodiments, $v < u/2$. In some embodiments, a truth table function is operable such that, on average, t is about s/4. in some embodiments, a subsequent truth table function is operable such that, on average, v is about u/4. In some embodiments, a converter comprises not less than five truth table functions located in series. In some embodiments, the converter comprises not less than 10 truth table functions located in series.

In some embodiments, a truth table function is operable to receive an input comprising two simultaneous non-deterministic random binary bits to produce an output obeying the following Truth Table, in which x denotes no output:

| input 1 | input 2 | output |
|---------|---------|--------|
| 0 | 0 | 0 |
| 0 | 1 | x |
| 1 | 0 | x |
| 1 | 1 | 1 |

Similarly, in some embodiments, a truth table function is operable to receive an input comprising two sequential random binary bits to produce an output according to the same Truth Table.

Figure 17:
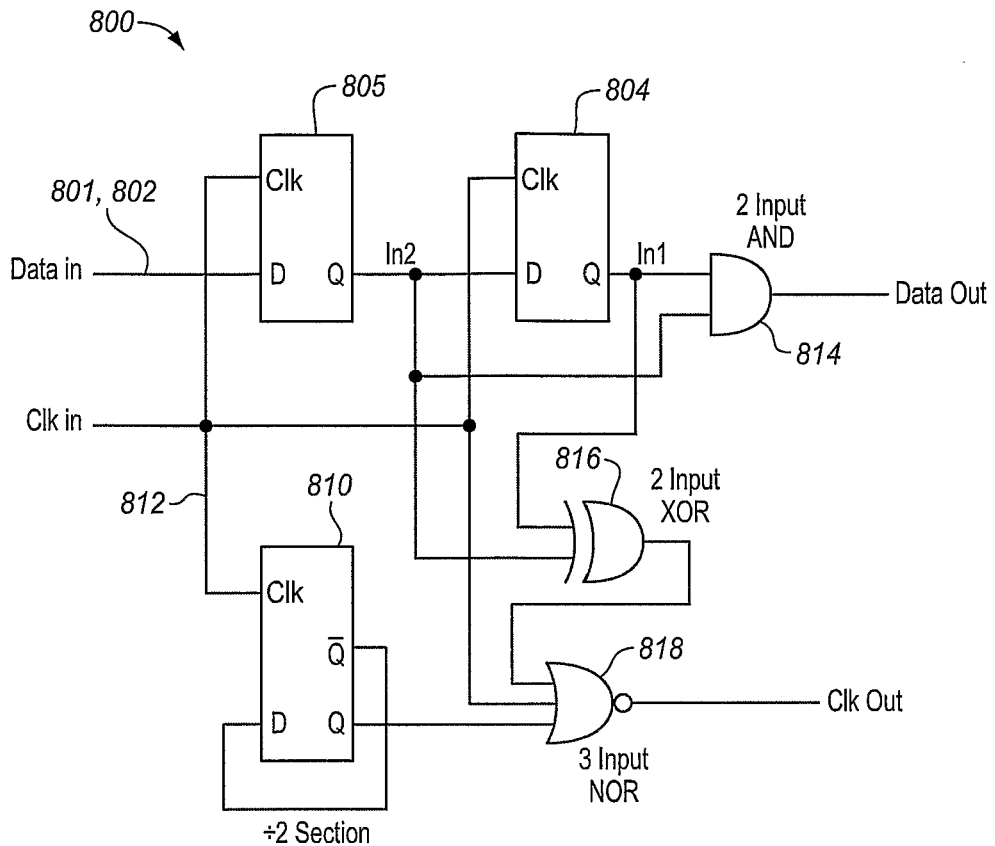
FIG. 17 contains a block diagram of a preferred truth table circuit that is operable to receive an input comprising two sequential random binary bits to produce an output obeying a bias-amplifier truth table.

For example, FIG. 17 contains a block diagram of a preferred truth table circuit 800 that is operable to receive an input comprising two sequential random binary bits to produce an output obeying the truth table shown above. Such a circuit functions as a bias amplifier. Latches 804, 805 are operable to store consecutive input bits 801, 802, respectively. Divide-by-two counter latch 810 is operable to divide clock frequency input by two. Logic AND gate 814 looks at two consecutive bits 801, 802 and produces an output "1" if both input bits have value "1", and output "0" if both input bits have value "0". Logic XOR gate 816 combines with logic NOR gate 818 to produce a clock output if input bits 801 and 802 are the same.

The following equations relate the average output bit rate and bias to the average input bit rate and input bias, with bias, B, expressed as the fraction of ones to total bits with B ranging from 0 to 1 and 0.5 being the unbiased expectation.

$$B_{out} = \frac{.5 B_{in}^2}{.5 - B_{in} + B_{in}^2} \quad 1)$$

$$\overline{br_{out}} = \overline{br_{in}}(.5 - B_{in} + B_{in}^2) \quad 2)$$

Figure 18:
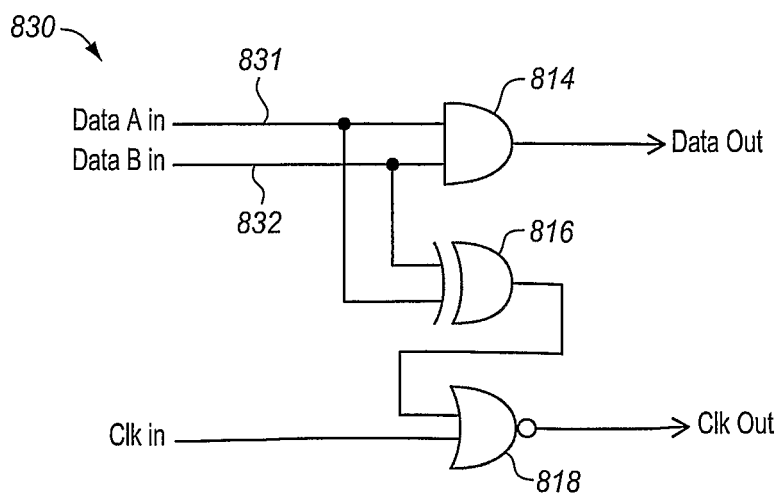
FIG. 18 contains a block diagram of a preferred truth table circuit that is operable to receive an input comprising two simultaneous (synchronous) random binary bits to produce an output obeying a truth table for performing a mutual bias conversion.

FIG. 18 contains a block diagram of a preferred truth table circuit 830 that is operable to receive an input comprising two simultaneous (synchronous) random binary bits 831, 832 to produce an output obeying the truth table shown above. This is a mutual bias converter. A circuit 830 that is operable to receive two simultaneous input bits is particularly useful to perform a truth table function of a converter that receives its input directly from two independent RNG output lines because only this data is certain to be simultaneous (or synchronous).

In some embodiments in accordance with the invention, a truth table function is operable to receive an input comprising two sequential output bits from a prior truth table function to produce an output obeying the same Truth Table:

| input 1 | input 2 | output |
|---------|---------|--------|
| 0       | 0       | 0      |
| 0       | 1       | x      |
| 1       | 0       | x      |
| 1       | 1       | 1      |

Thus, a circuit 800 as depicted in FIG. 17 is also useful to process output from a preceding truth table function.

In some embodiments in accordance with the invention, a converter further comprises a converter truth table function, the converter truth table function being operable to convert a plurality of input subsequences of random binary bits having a first pattern to subsequences of random binary bits having a second pattern. In some embodiments, a converter truth table function is operable to receive an input comprising two random binary bits from a source and to produce a converter output obeying the following Truth Table:

| input 1 | input 2 | output |
|---------|---------|--------|
| 0       | 0       | 1      |
| 0       | 1       | 0      |
| 1       | 0       | 0      |
| 1       | 1       | 1      |

If the input bits are from the same sequence, then the converter is an autocorrelation converter. If the input bits are from two independent simultaneous sequences, then the converter is a cross-correlation converter. This truth table function is implemented in hardware by a two-input exclusive-NOR logic gate.

A runs converter compares consecutive bits in a sequence of bits. A runs converter typically uses an overlapping window of input bits that slides one bit along the input sequence to produce a conversion for each new input bit. Converters for runs longer than one use a window of input bits of length equal to the run length to be converted plus two bits. For each runs converter for runs of length N, the corresponding truth table will have 2 to the power of N+2 possible input patterns and only two active outputs. The active outputs correspond to the two patterns where the first and last input bits are equal and all other input bits are the complement of the first and last input bits. The active output is equal to the complement of the first or last input bit. The runs converter produces a no-output condition, x, for all other patterns.

A simple, two-run converter essentially looks at four bits at a time: a first bit, a last bit and two middle bits. When the two middle bits are identical, and the first and last bits are both different from the two middle bits, then there is a run of two bits. In this case, if both middle bits have a value of "1", then there is an output of "1". If both middle bits have a value of "0", then there is an output of "0". If on the other hand, the middle bits are not identical, then there is no output. Similarly, a runs-of-three converter looks at five bits, a first bit, a last bit and three middle bits. A runs-of-one converter uses three consecutive bits in a sequence.

Typically, the operation of a runs converter is represented as a truth table function. A truth table for a runs-of-one converter is shown here:

| input 1 | input 2 | intput3 | output |
|---------|---------|---------|--------|
| 0       | 0       | 0       | x      |
| 0       | 0       | 1       | x      |
| 0       | 1       | 0       | 1      |
| 0       | 1       | 1       | x      |
| 1       | 0       | 0       | x      |
| 1       | 0       | 1       | 0      |
| 1       | 1       | 0       | x      |
| 1       | 1       | 1       | x      |

A runs converter is useful in several ways. A runs converter detects a property of a sequence of bits that is responsive to an influence of mind. Also, a runs-of-two converter detects a response to mental influence that is independent of the results of a bias amplifier or of an autocorrelation converter. Therefore, a runs converter is useful to independently assess the reliability of the results of a detection of an influence of mind.

Figure 19:
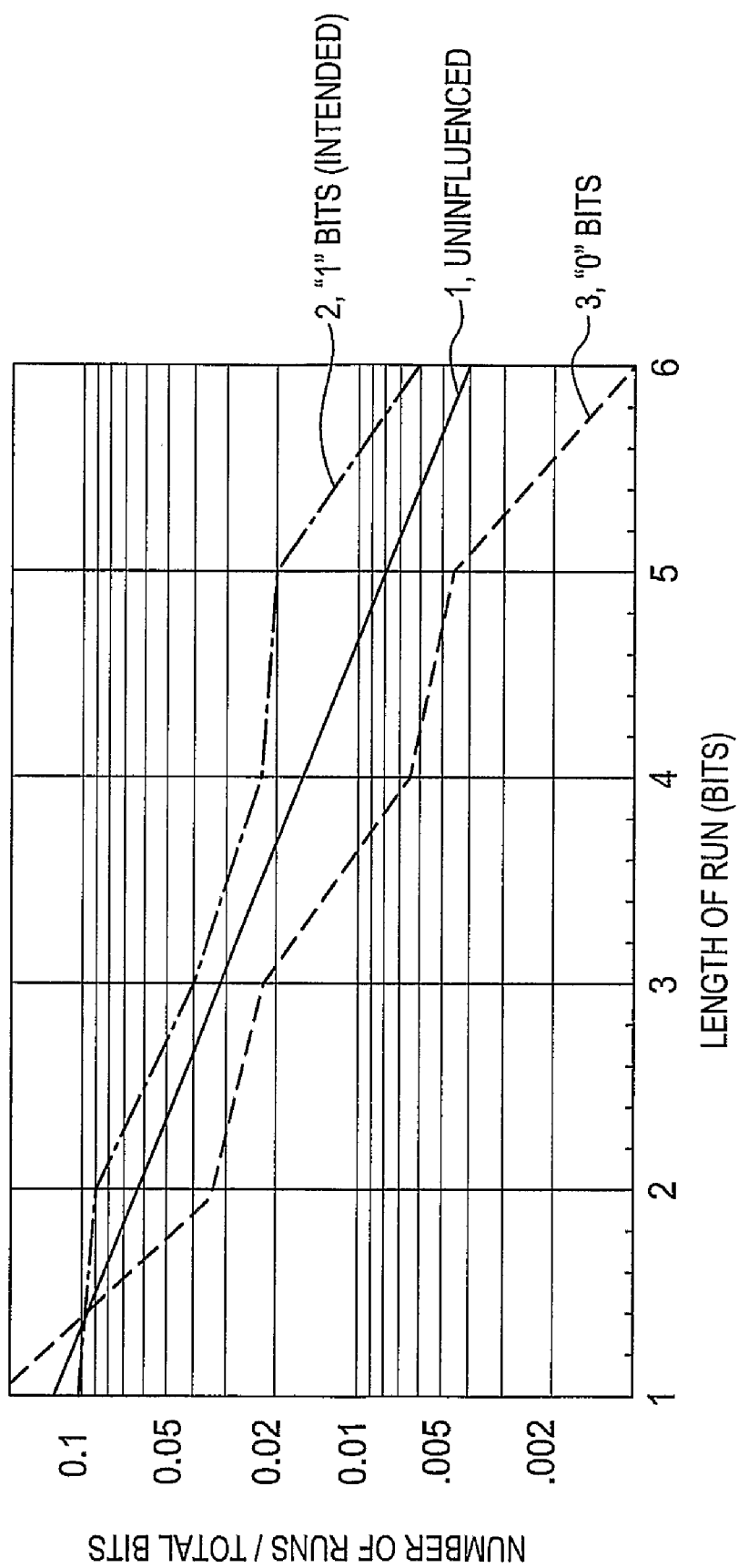
FIG. 19 contains a logarithmic graph in which the fraction of runs in a sequence of bits of a given type ("1" and "0") is plotted as a function of length of runs (in bits)
Figure 20:
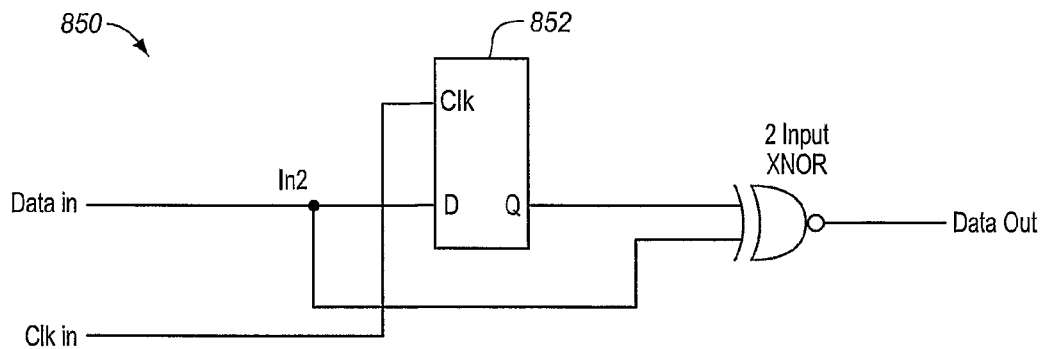
FIG. 20 contains a block diagram of a circuit having a single storage latch and operable to convert first order autocorrelation to bias.

The fraction of runs with a given value, for example, "1", of a given run-length, versus the total number of bits in a sequence of random bits that are un-influenced by mind, produces a known distribution. This distribution is given by the equation: Number of Runs/Total Bits in Sequence=0.25/$2^{RL}$, where RL is the Length of Runs in bits. When a sequence of random bits is influenced by mind, the influence of mind changes the distribution of runs having a given length and a given value. Generally, when a given type of bit (e.g., "1") corresponds with an intended output, the fraction of runs of the given type in runs of shorter length decreases with influence of mind, and the fraction of runs of the bit type in runs of longer length increases. FIG. 19 contains a logarithmic graph in which the fraction of runs in a sequence of bits of a given type ("1" and "0") is plotted as a function of length of runs (in bits). The diagonal curve 1 represents the average fraction of runs of bits both of type "1" and type "0" occurring in a sequence of random bits that is un-influenced by mind. Curve 2 in the graph of FIG. 19 represents the fraction of runs of "1" bits of various run-lengths when "1" bits correspond to an intended result. Curve 3 represents the corresponding fraction of runs of "0" bits of various run-lengths when "1" bits correspond to the intended result. As shown by curve 2 depicted in the graph, the fraction of runs of "1" bits in short runs of 1 decreases as a result of an influence of mind, while the fraction of runs of "1" bits in longer runs of 2 or more increases as a result of an influence of mind. Conversely, curve 3 shows that the fraction of runs of "0" bits (which correspond to "misses", i.e., results counter to intended results) increase for short runs of 1 and decrease for longer runs of 2 or more. In some cases, when the influence of mind on the random number sequence is stronger, the fraction of runs of "1" bits decreases in runs of 1 and 2, and increases in longer runs of 3 or longer, with a corresponding inverted result for runs of "0" bits.

A transitions converter compares consecutive bits in a sequence and generates an output when there is a transition from one bit value to another. When there is no transition, there is no output. Typically, the operation of a transitions converter can be represented as a truth table function.

A truth table for a two-bit transition converter is shown here:

| input 1 | input 2 | output |
|---------|---------|--------|
| 0 | 0 | x |
| 0 | 1 | 1 |
| 1 | 0 | 0 |
| 1 | 1 | x |

A two-bit converter only uses non-overlapping windows of input bits. Transition converters longer than two bits can use either overlapping or non-overlapping windows of input bits.

A truth table for a three-bit transition converter is shown here:

| input 1 | input 2 | intput3 | output |
|---------|---------|---------|--------|
| 0 | 0 | 0 | x |
| 0 | 0 | 1 | 1 |
| 0 | 1 | 0 | x |
| 0 | 1 | 1 | x |
| 1 | 0 | 0 | x |
| 1 | 0 | 1 | x |
| 1 | 1 | 0 | 0 |
| 1 | 1 | 1 | x |

In some embodiments, a converter truth table function is operable to accept a subsequence of random bits from a sequence of random binary bits and to convert a statistical autocorrelation in the subsequence to a bias. A circuit corresponding to circuit 850 depicted in FIG. 20 having a single storage latch 852 is suitable for converting first order autocorrelation to bias. Higher order autocorrelation is converted to bias by adding additional latches in series. For example, a circuit similar to circuit 850 in FIG. 20 but including a second latch in series with latch 852 is suitable for converting second order autocorrelation to bias.

In some embodiments, the converter comprises a bias amplifier, and a converter truth table function is operable to accept sequences of simultaneous random binary bits and to convert a statistical cross-correlation in the sequences to a bias. For example, a circuit corresponding to circuit 850 depicted in FIG. 20 but having no latch, that is, a two-input Exclusive-Nor (XNOR) logic gate, is suitable for converting cross-correlation to bias.

In some embodiments of an anomalous effect detector, the converter comprises a plurality of initial truth table functions. Each initial truth table function forms a path for processing random binary bits, the path being parallel to the other initial truth table functions. Also, each initial truth table function is operable to accept an input comprising a subsequence of random binary bits having s number of bits and to generate an output having t number of bits, wherein $s \geq 2$ and $0 \leq t < s$. Some embodiments further comprise one or more subsequent truth table functions located consecutively in each of one or more of the parallel paths. A subsequent truth table function is operable to accept an input comprising u number of output bits from a prior truth table function and generating an output having v number of bits, wherein $u \geq 2$ and $0 \leq v < u$. In some embodiments, the converter comprises not less than five subsequent truth table functions in a path. In some embodiments, the converter comprises not less than 10 subsequent truth table functions in a path. In some embodiments, $t \leq s/2$. In some embodiments, $v \leq u/2$. In some embodiments, an initial truth table function is operable such that, on average, t is about s/4. In some embodiments, a subsequent truth table function is operable such that, on average, v is about u/4.

Figure 21:
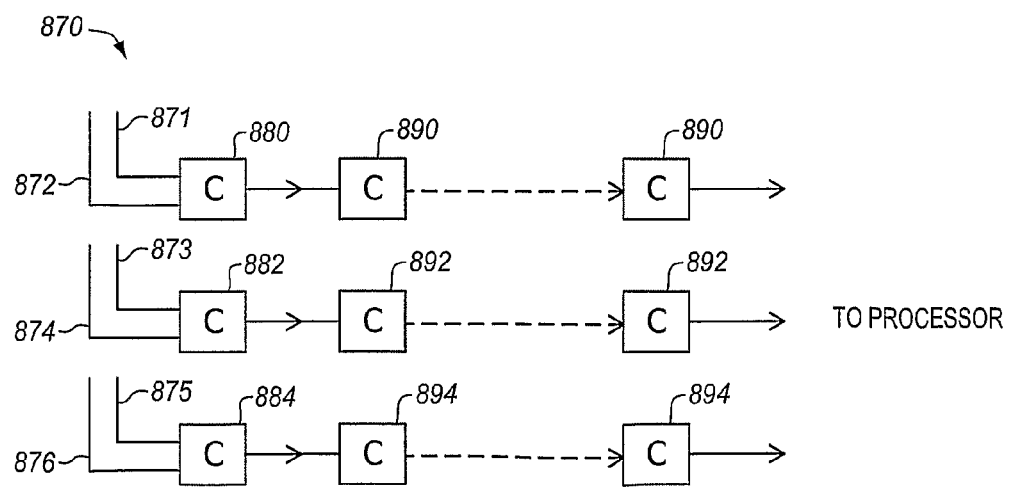
FIG. 21 contains a block diagram representing a converter in accordance with the invention that is operable to accept subsequences of random binary bits from six sequences of randomness corrected data of a random number source.

FIG. 21 contains a block diagram representing a converter 870 in accordance with the invention that is operable to accept subsequences of random binary bits from six sequences of randomness corrected data 871, 872, 873, 874, 875, 876 of a random number source. Converter 870 contains three parallel input truth table functions 880, 882, 884. Input truth table function 880 accepts data from corrected random number sequences 871, 872. Similarly, input truth table functions 882, 884 accept data from sequences 873, 874 and 875, 876, respectively. The output of input truth table functions 880, 882, 884 is accepted by subsequent truth table functions 890, 892, 894, respectively. Typically, as depicted in FIG. 21, each of the three parallel data processing paths initiated by input truth table functions 880, 882, 884 include a plurality of subsequent truth table functions 890, 892, 894, respectively. As a result of the repeated application of truth table functions, data in a given parallel path is decreased. For example, in some embodiments, converters used to measure bias in input data and having a total of 15 consecutive truth table functions in a path (e.g., the path including truth table functions 880, 890 in FIG. 21) accomplish a decrease in data by a factor of about $2^{30}$. Truth table functions in accordance with the invention typically have a high statistical efficiency. As a result, anomalous effect detectors in accordance with the invention typically achieve very high statistical efficiency; for example, virtually 100 percent.

Converter 870 was described with reference to FIG. 21 above to accept six sequences of randomness corrected random numbers. It is understood that a variation of converter 870 is also operable to accept a single sequence of randomness corrected random numbers that is split into subsequences that are then processed in parallel paths.

In some embodiments in accordance with the invention, a converter is operable to have a theoretical information rate of at least 0.5 bits per minute.

Generally, an anomalous effect detector or a quantum computer in accordance with the invention is operable such that the theoretical information rate, R, may be calculated using the equation: $R = \text{bit rate} \cdot (1 + p \log_2 p + (1-p)\log_2(1-p))$.

Information Rate, R, is: R=bit rate (1−H) where bit rate is the number of bits/second, or other unit of time, and H is the mathematical entropy of the signal.

Shannon entropy for binary bit streams is defined: $H=-p \log_2 p - (1-p) \log_2 (1-p)$, where p=number of correct bits ("Hits")/total number of bits. R is the theoretical noise-free information transfer rate in bits/unit time. Information rate R is broadly usable in accordance with the invention to quantify both the capabilities of operators and the responsiveness or sensitivity of devices in the field of anomalous cognition, and is superior to other measures previously used for this purpose.

Generally, a determined quantum value is obtained by the act of measuring it. In embodiments in accordance with the invention, a non-deterministic random bit is generated by measuring it. It can be viewed that before measurement, there is a superposition of "1" and "0". For example, a measurement occurs when a LF oscillator latches a HF counter. In such a case, a bit does not have a value of "1" or "0" until it is latched. The indeterminacy of timing of the LF oscillator (or other random noise source) makes the measured bit non-deterministic (i.e., true random rather than pseudorandom). The indeterminacy of timing is caused by shot noise or thermal noise or both, which are at least partially quantum mechanical.

Studies have shown and it is now widely recognized that a human mind (and presumably the mind of other sentient beings) is capable of influencing quantum probabilities. See, for example: *Quantum physics in neuroscience and psychology: a neurophysical model of mind-brain interaction*, by Jeffrey M. Schwartz et al., *Phil. Trans. R. Soc. B*, The Royal Society (2005) (published online); *Quantum Collapse, Consciousness and Superluminal Communication*, by Gao Shan, *Chinese Institute of Electronics* (published online); *Visual Conscious Experience*, by Mitja Perus, BION Institute, Ljubljana, Slovenia (published online). An embodiment in accordance with the present invention is operable to respond to an influence of mind of a human operator (or other sentient organism) on quantum mechanical wavefunctions. It is believed that among other effects, mind influences quantum mechanical wavefunctions to cause entanglement. Further, it is believed that mind causes quantum mechanical entanglement of truly random bits in a physical source 404, 434 of entropy with target information. An embodiment of quantum computer 400, 430 is particularly useful when desired target information is hidden or non-inferable from currently available information. Mind influences sources of entropy, such as sources 404, 434, which are quantum mechanical. The influence of mind shifts a probability or probabilities of the results of measurements of bits in entropy sources 404, 434. Such shifts of probabilities of bits include shifts in bias, autocorrelation, and other more complex probabilities and properties. In accordance with the invention, measurement processor 410, 440 enhances the effects of shifted probabilities of bits in the stream of numbers from source 404, 434.

Figure 22:
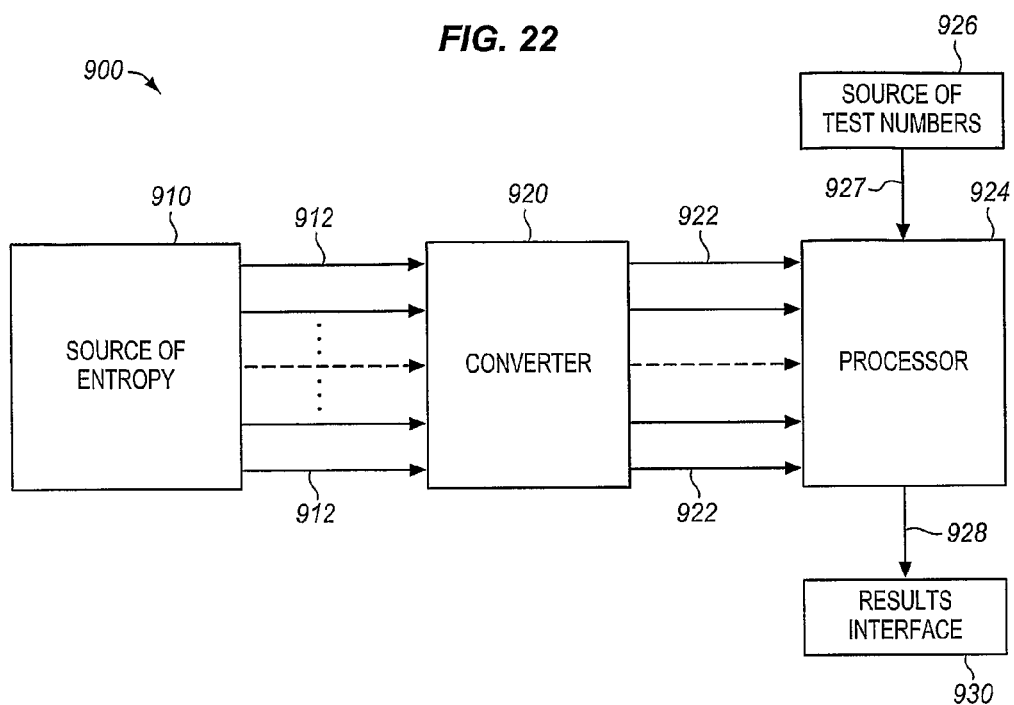
FIG. 22 depicts schematically quantum computer in accordance with the invention comprising a physical source of entropy that is operable to generate a plurality of output numbers.

FIG. 22 depicts schematically quantum computer 900 in accordance with the invention. Quantum computer 900 comprises physical source of entropy 910 that is operable to generate a plurality of output numbers 912. In some embodiments in which entropy source 910 comprises a LF oscillator and a HF counter, the entropy in a word read from the counter is estimated by analyzing a sequence of words read from the counter. Exemplary amounts of entropy are in a range of from 1.0 to 3.0 bits. In some embodiments which have a 1 kHz LF oscillator and in which the entropy in a counter is greater than 1.0 and less than 2.0, entropy source 910 generates output bits, each having an entropy approaching 1.0, at a rate of 1000 bits per second. Each output bit that is generated is directed to one of the plurality of output streams 912. The output bits are generated, however, in rapid succession by entropy source 910. Each of output bit streams 912 is processed in accordance with the invention in converter 920.

Processor 924 accepts converter output bits 922. Quantum computer 900 also comprises source 926 of test bits 927. Processor 924 processes the plurality of converter output bits 922, including measuring whether there is a match between processor results and a test bit. Processor 924 then generates a combined processor output 928, which is sent to results interface 930. Processor output bit 928 is representative of an influence of mind. Processor output bit 928 contains fewer numbers than the input of converter output bits 922.

It is believed that an operator's mind influences quantum probabilities in entropy source 910 and in test number source 926, resulting in at least partial entanglement of the quantum mechanical entropy sources of entropy source 910 and test number source 926, thereby increasing the probability of a match between the measurement of the influence of mind and a test number.

Figure 23:
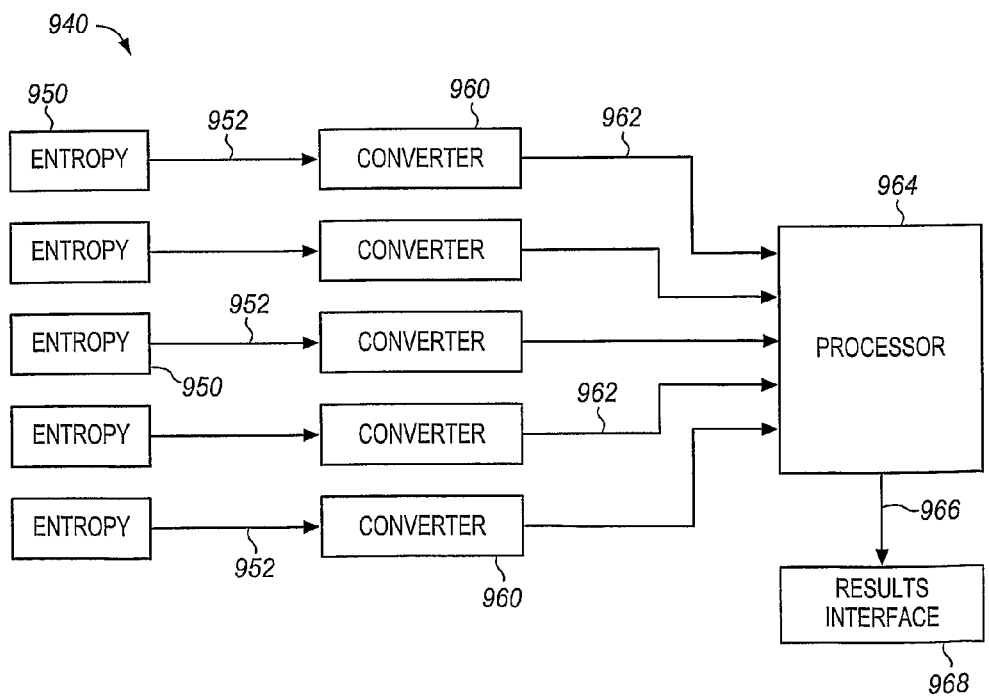
FIG. 23 depicts schematically a quantum computer in accordance with the invention comprising a plurality of entropy sources that are operable to generate a plurality of output streams.

FIG. 23 depicts schematically a quantum computer 940 in accordance with the invention. Quantum computer 940 comprises a plurality of entropy sources 950 that are operable to generate a plurality of output streams 952. Quantum computer 940 further includes a plurality of converters 960 in accordance with the invention, corresponding to each of entropy sources 950. Each output stream 952 is processed in accordance with the invention in a converter 960. Processor 964 accepts converter output 962. Processor 964 processes converter output 962 in accordance with the invention. Processor 964 then generates processor result 966, which is sent to results interface 968.

It is believed that the entropy sources in the plurality of entropy sources 950 are entangled in a quantum mechanical sense. According to one view, actual sources 950 are entangled, not necessarily the numbers (bits). According to this view, the numbers that come out of entropy sources 950 have a relationship because entropy sources 950 were entangled. Also, random number sources 950 are entangled not only with each other but with the intended outcome, hidden or non-inferable information. It is believed that an operator's mind influences quantum probabilities in entropy sources 950, resulting in at least partial entanglement of the quantum mechanical entropy sources of entropy sources 950 and target information (e.g., a test bit or desired unknown information), thereby increasing the probability of a match between the result 966 and target information.

According to one view, actual bits are not entangled. Once measured (or latched), the bits are determined. According to this view, if a bit is 1 or 0, it cannot be entangled. According to this view, entropy sources are entangled. After a quantum computer in accordance with the invention generates a random bit, that is, after measurement is made, superposition exists no longer. But, since a source can be entangled, for example, with a future bit or with unknown information, and since sources can be entangled, one or more physical sources of entropy in accordance with the invention generate one or more streams of output bits having a coherent pattern, from which the processor produces the desired result. Multiple entangled sources give a greater effect than a single source, which is entangled only with the intended result. A traditional quantum computer typically is run several times to obtain a reliable result because a quantum computer's output is always probabilistic.

A quantum computer in accordance with the invention responds to influences of the mind of an operator on quantum probabilities of physical sources of entropy or quantum circuits. Accordingly, mind influences sources of entropy, such as sources 404, 434, 910, 950, which are at least partially quantum mechanical. The influence of mind shifts a probability or probabilities in a source of entropy. It is understood that an operator need not be spatially close to a quantum computer in accordance with the invention to achieve good results. In fact, in some embodiments, an operator is located hundreds and even thousands of miles away from the one or more sources of entropy 404, 434, 910, 950. Similarly, in embodiments in accordance with the invention comprising a source of test numbers 406, 436, 926, the operator need not be in close spatial proximity to the source. Also, in some embodiments, the operator does not physically initiate operation of the quantum computer (such as by using a keypad).

A mental influence detector in accordance with the invention is useful in a wide variety of applications. Some embodiments are operable as an information accuracy enhancement device, particularly when the information is not accessible by classical methods. Some embodiments are operable as a predicted information accuracy enhancement device, particularly when the predicted information is not accessible by classical methods. Some embodiments are operable as a communication accuracy enhancement device, particularly when the communication is not accessible by classical methods. Some embodiments are operable to respond directly to an influence of mind. Some embodiments are operable to respond to mental intention in conjunction with a game.

In some embodiments in accordance with the invention, a mental influence detector is portable. Some embodiments further comprise a connection to the internet. In some embodiments, a mental influence detector interfaces to a device, such as a computer or server, that is connected to the internet. Functions of a mental influence detector having high processing rates (e.g., on the order of billions of operations per second) are typically in an FPGA or other hardware implementation because of the very high processing rates (too fast to process by a computer). Nevertheless, additional truth table processing may be done in a computer before the information is sent over the internet or over phone or a wireless connection to an output device where an operator is located. Any connection to other physiological measurement devices typically is done where the operator is located, but the results may be sent back to a "base" location where the detector is located for further processing and correlation. In some embodiments, the results of this further processing is then sent back to the output device for use by the operator. In other words, in embodiments in accordance with the invention that are internet-based, the several components of an anomalous effect detector or of a quantum computer in accordance with the invention are located separately from each other, sometimes separated by hundreds or thousands of miles.

In some embodiments, the mental influence detector is operable in a combination with a game, and the combination includes a source of a sequence of random binary bits.

Some embodiments in which the mental influence detector is operable in the combination with the game further comprise a connection to the internet.

Figure 24:
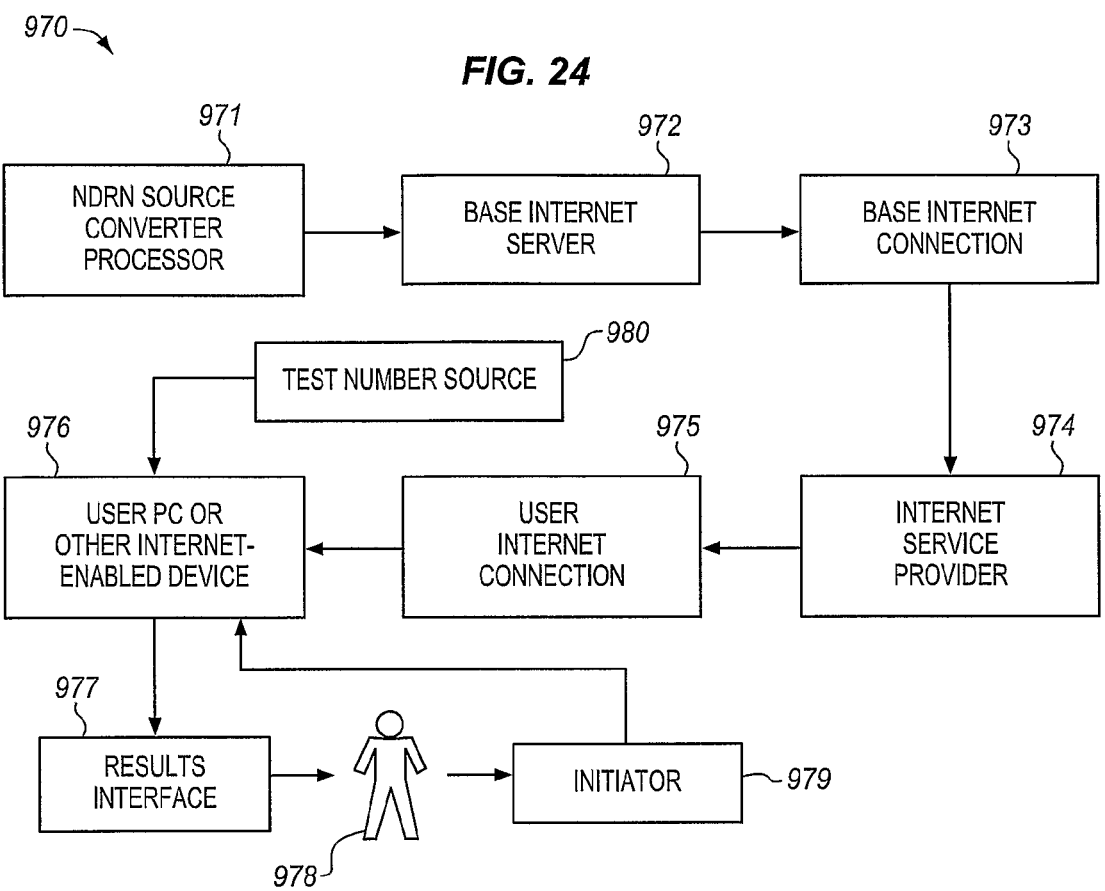
FIG. 24 contains a block diagram of an internet-based system comprising at least one mental influence detector in accordance with the invention.

FIG. 24 contains a block diagram of an internet-based system 970 in accordance with the invention. System 970 includes at least one mental influence detector, but several of the components of a mental influence detector are spatially separated from each other, possibly by large distances up to hundreds or thousands of miles. System 970 comprises a base module 971, which base module includes a source of numbers (NDRN), a converter and a processor in accordance with the invention. Base module 971 is connected to a conventional internet server 972. Through a conventional internet connection 973, an internet service provider 974 and a user internet connection 975, a user's personal computer (PC) 976 or other internet-enabled device is connected to base module 971. Typically, user PC 976 includes an output device, which is utilized as a results interface 977 in accordance with the invention to convey results to an operator 978. Typically, system 970 comprises an initiator 979 connected to user PC 976, with which operator 978 initiates detection by system 970 of an influence of mind. Some embodiments include test number source 980 in accordance with the invention. Preferably, test number source 980 is located in or proximate to user PC 976.

Certain common features have been observed during hundreds of testing sessions with some embodiments of mental influence detectors in accordance with the invention. In certain applications of a mental effect detector, a lack of attention, drifting or loss of focus typically correspond to a reduction in results. A new operator, or an experienced operator, when significant changes have been made to hardware configuration or processing methods, usually benefits from an initial learning period. After a learning period has passed, results typically follow a pattern of rapid initial rise in the measured influence of mind followed by a peak shortly after the beginning of the session, and then a gradual decline down to some positive basal level substantially lower than the peak. Experienced operators typically maintain the basal level longer and at a higher level than newer operators. Persistence, regularity and motivation to train usually boost the abilities of an operator. These abilities are cumulative over the long term and show persistence in other areas of the operator's life. Certain conditions of the operator may reduce measured mental influence. These include physical discomfort or illness, mental upset or distraction and physical or mental fatigue.

Embodiments of mental influence detectors in accordance with the invention are applicable in various areas of anomalous cognition and machine-enhanced anomalous cognition. These include areas of research into mind, consciousness and reality that are variously referred to as ESP, Psi, Psychic Phenomena, Remote Viewing, Telepathy, Clairvoyance, Clairaudience, Psychokinesis, Precognition, Mental Powers, among other. Some specific areas of utilization include communications, enhanced decision making, medical diagnosis and treatment options, enhanced computing machines, lie detection, enabling the handicapped, locating lost or hidden objects, and increasing correct prediction probabilities for everything from games of "chance" to market moves.

The particular systems, devices and methods described herein are intended to illustrate the functionality and versatility of the invention, but should not be construed to be limited to those particular embodiments. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above systems and methods without departing from the scope of the invention, it is intended that all subject matter contained in the above description or shown in the accompanying drawings be interpreted as illustrative and not in a limiting sense. Consequently, the invention is to be construed as embracing each and every novel feature and novel combination of features present in or inherently possessed by the systems, devices and methods described in the claims below and by their equivalents.

The invention claimed is:

1. A method of detecting an influence of mind, comprising:
   providing input numbers from a source of non-deterministic random numbers;
   converting a property of said input numbers into a converter output comprising bias representative of said property, wherein said converting comprises amplifying bias in a bias amplifier, and wherein bias is expressed as the fraction of ones to total bits in a sequence of binary numbers;
   producing a processor output signal representative of an influence of mind by processing said converter output, wherein said processor output signal contains fewer numbers than said input numbers; and
   communicating said processor output signal.

2. A method of detecting an influence of mind as in claim 1 wherein said providing said input numbers comprises:
   reducing a statistical defect in said input numbers.

3. A method of detecting an influence of mind as in claim 2 wherein:
   said reducing a statistical defect reduces bias in said input numbers to less than 10 ppm and reduces autocorrelation in said input numbers to less than 10 ppm.

4. A method of detecting an influence of mind as in claim 1 wherein said providing input numbers comprises:
   generating input numbers having a bias less than 10 ppm and an autocorrelation less than 10 ppm.

5. A method of detecting an influence of mind as in claim 1 wherein:
   said converting a property of said input numbers comprises at least one step of converting selected from the group consisting of: converting a cross-correlation to a bias representative of said cross-correlation, converting a mutual bias to a bias representative of said mutual bias, and converting runs to a bias representative of said runs.

6. A method of detecting an influence of mind as in claim 1 wherein said amplifying a bias comprises:
   performing a truth table bias function.

7. A method of detecting an influence of mind as in claim 1 wherein said amplifying a bias comprises:
   performing a bounded random walk.

8. A method of detecting an influence of mind as in claim 1 wherein said converting a property of said input numbers comprises:
   converting autocorrelation in said input numbers into a bias representative of said autocorrelation.

9. A method of detecting an influence of mind as in claim 1, further comprising:
   providing at least one test number;
   measuring a relationship between said converter output and said at least one test number to produce a relationship measurement; and
   abstracting said relationship measurement to provide an enhanced output signal representative of said influence of mind.

10. A method of detecting an influence of mind as in claim 9 wherein said providing said at least one test number comprises:
    providing test numbers having a fixed pattern.

11. A method of detecting an influence of mind as in claim 9, further comprising:
    initiating a detection of said influence of mind using an initiator; and
    wherein said providing said at least one test number comprises providing at least one test number before said initiating said detection.

12. A method of detecting an influence of mind as in claim 9, further comprising:
    initiating a detection of said influence of mind using an initiator; wherein said providing said at least one test number comprises providing at least one test number after said converting a property of said input numbers into a converter output.

13. A method of detecting an influence of mind as in claim 1 wherein said providing said input numbers comprises:
    providing input numbers from a source of non-deterministic random numbers located in a device selected from the group consisting of an FPGA and an ASIC.

14. A method of detecting an influence of mind as in claim 13 wherein said providing input numbers comprises:
    using an independent ring oscillator.

15. A method of detecting an influence of mind as in claim 1, further comprising:
    initiating a detection of said influence of mind.

16. A method of detecting an influence of mind as in claim 15 comprising:
    receiving a conditioned physiological measurement to initiate a detection.

17. A method of detecting an influence of mind as in claim 15 comprising:
    receiving an output from an influence-of-mind detector to initiate a detection.

18. A method of detecting an influence of mind as in claim 15 wherein said detection is initiated automatically and periodically.

19. A method of detecting an influence of mind as in claim 1 wherein said communicating said processor output signal comprises using an interface selected from the group consisting of: a cell phone screen and a cell phone speaker.

20. A method of detecting an influence of mind as in claim 1 wherein said communicating said processor output signal comprises communicating using the internet.

21. A method of detecting an influence of mind as in claim 1 wherein said providing input numbers from a source of non-deterministic random numbers is performed spatially separated from said communicating said processor output signal.

22. An influence-of-mind detector, comprising:
    a source of non-deterministic random numbers;
    a converter operable to accept input numbers from said source and to convert a property of said input numbers into a converter output comprising amplified bias representative of said property, wherein bias is expressed as the fraction of ones to total bits in a sequence of binary numbers;
    a bias amplifier included in said converter;
    a processor that is operable to accept said converter output and to produce a processor output signal representative of an influence of mind; wherein said processor output signal contains fewer numbers than said input numbers; and
    an interface that is operable to communicate said processor output signal.

23. An influence-of-mind detector as in claim 22 wherein said source of non-deterministic random numbers comprises:
    a randomness corrector.

24. An influence-of-mind detector as in claim 22 wherein said converter comprises:
    an autocorrelation converter that is operable to convert autocorrelation in said input numbers into a bias that is representative of said autocorrelation.

25. An influence-of-mind detector as in claim 22, further comprising:
a source of test numbers; and wherein
said processor is operable to measure a relationship between said converter output in said processor and at least one test number to produce a relationship measurement; and
said processor is further operable to abstract said relationship measurement to provide an enhanced output signal representative of said influence of mind.

26. An influence-of-mind detector as in claim 22 wherein said source of non-deterministic random numbers is located in a device selected from the group consisting of an FPGA and an ASIC.

27. An influence-of-mind detector as in claim 26 wherein said source of non-deterministic random numbers comprises: an independent ring oscillator.

28. An influence-of-mind detector as in claim 22, further comprising;
an initiator that is operable to initiate a detection of an influence of mind.

29. An influence-of-mind detector as in claim 22 wherein said interface is selected from the group consisting of: a cell phone screen and a cell phone speaker.

30. An influence-of-mind detector as in claim 22 wherein said interface comprises an internet-enabled device.

31. An influence-of-mind detector as in claim 22 wherein said source of non-deterministic random numbers is spatially separated from said interface.

* * * * *